United States Patent [19]
Schanel

[11] Patent Number: 5,943,062
[45] Date of Patent: Aug. 24, 1999

[54] SYSTEM AND METHOD FOR AUTOMATICALLY ROUTING A LINE IN A GRAPHICS CHART

[75] Inventor: Scott J. Schanel, San Francisco, Calif.

[73] Assignee: Micrografx, Inc., Richardson, Tex.

[21] Appl. No.: 08/600,887

[22] Filed: Feb. 13, 1996

[51] Int. Cl.⁶ .................................................. G06T 11/20
[52] U.S. Cl. ........................................................ 345/440
[58] Field of Search .................................. 395/140, 143, 395/440–43; 364/423.098, 424.027, 424.032, 424.029, 424.031

[56] References Cited

U.S. PATENT DOCUMENTS

| 5,280,569 | 1/1994 | Tsujido | 345/427 |
| 5,450,535 | 9/1995 | North | 345/440 |
| 5,461,397 | 10/1995 | Zhang et al. | 345/102 |
| 5,465,088 | 11/1995 | Braegas | 340/905 |
| 5,511,158 | 4/1996 | Sims | 345/443 |
| 5,519,822 | 5/1996 | Barkans et al. | 345/443 |
| 5,523,950 | 6/1996 | Peterson | 364/436 |
| 5,588,108 | 12/1996 | Kumar et al. | 395/348 |
| 5,598,532 | 1/1997 | Liron | 395/200.01 |
| 5,634,093 | 5/1997 | Ashida et al. | 345/443 |

*Primary Examiner*—Rudolph J. Buchel, Jr.
*Attorney, Agent, or Firm*—Baker & Botts, L.L.P.

[57] ABSTRACT

A method for automatically routing a line (54) through a graphics chart (28) from a starting point (70) to an ending point (71) in the chart is provided. The method includes collecting data for the chart (28) representing the location of each symbol (30, 32, 34, 36, 38, 40, & 42) in the chart (28) and the starting (70) and ending (71) points for the line. The method further includes determining a number of paths for the line (54) from the starting point (70) to the ending point (71) and scoring each of the lines. The method also includes selecting the line (54) with the best score as the line to route from the starting point (70) to the ending point (71).

28 Claims, 13 Drawing Sheets

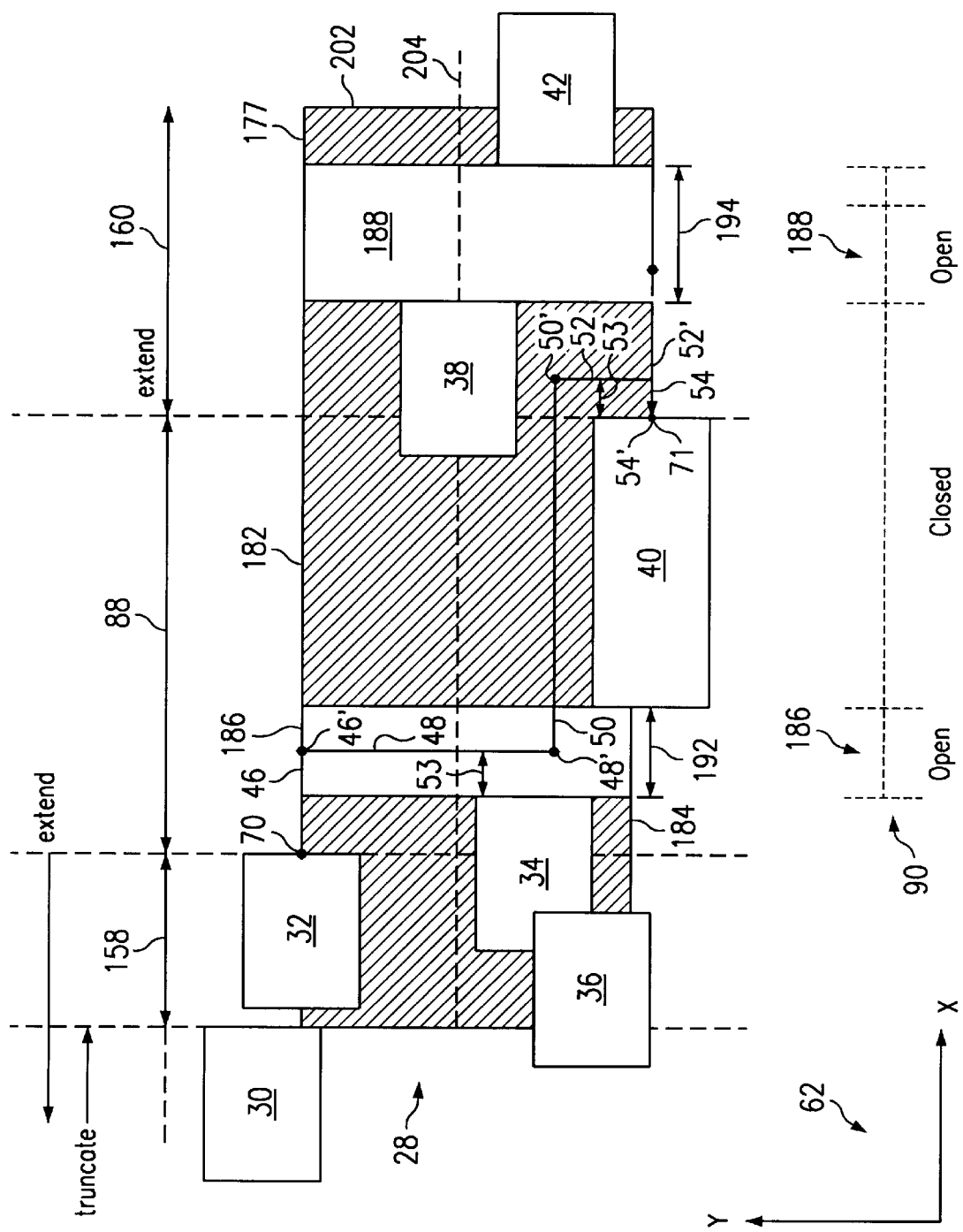

SYSTEM AND METHOD FOR AUTOMATICALLY ROUTING A LINE IN A GRAPHICS CHART

TECHNICAL FIELD OF THE INVENTION

This invention relates to the field of computer-generated graphics, and more particularly to a system and method for automatically routing a line in a graphics chart.

BACKGROUND OF THE INVENTION

Graphics are the easiest way to communicate information. The creation of graphic layouts or charts has progressed from manual pen and paper generation techniques to computer aided techniques. Previously developed computer graphics programs or applications generally provide clean, professional graphics in a fraction of the time required for hand-drawn graphics. Unfortunately, these computer programs can be complicated and may require high-end computer systems in order to run the software program.

Graphics are useful in presenting many types of information. Often, graphics are useful in representing the relationships of people in an organization, groups within an organization, or the steps in a given process. These relationships are typically designated through relational spacing and orientation between related symbols, as well as through the use of a line showing exchanges or interfaces between the symbols in a graphics chart. Family trees, organizational charts, cause-and-effect diagrams, pyramid charts, and flow charts are some examples of graphics charts that may be useful in presenting information.

Several prior computer graphics systems have been developed for generating graphics charts. As previously noted, these charts often require a line or lines be shown in the chart to show the relationship between symbols in the chart. Routing a line between symbols in a chart may pose difficulties to a computer graphics system. In the past, such computer systems did not have the ability to route a line through the symbols in a chart without piercing or breaking through an intermediate symbol. Such systems employed "the shortest distance between two points is a straight line" rule or variations thereof to route a line through the chart or consider only the symbols being connected by the line and ignore whether the line pierces other symbols in the chart. Unfortunately, such systems would often pierce or break through the symbols in the chart. Graphics charts generated this way lack aesthetic appeal for this reason.

In the prior computer graphics systems, in order to route a line between two points while avoiding the symbols in the chart it was necessary that each segment of the line be treated as a separate line that had to be drawn by the user. There was no way to automatically control the placement of segments in a line to route the line through a chart while avoiding the symbols in the chart. This may make generating a graphics chart a tedious undertaking.

SUMMARY OF THE INVENTION

In accordance with the present invention, a computer graphics system having an automatic line routing system and method are provided that substantially eliminate or reduce disadvantages and problems associated with previously developed graphics systems and methods.

One aspect of the present invention provides a method for automatically routing a line through a graphics chart from a starting point to an ending point in the chart. The method includes collecting data for the chart representing the location of each symbol in the chart and the starting and ending points for the line. The method further includes determining a number of paths for the line from the starting point to the ending point and scoring each of the paths. The method also includes selecting the path with the best score as the path to route the line from the starting point to the ending point.

Another aspect of the present invention provides a computer program for automatically routing a line through a graphics chart from a starting point to an ending point in the chart. The program includes computer implemented instructions for collecting data for the chart representing the location of each symbol in the chart and the starting and ending points for the line. The program also includes instructions for determining a number of paths for the line from the starting point to the ending point and for scoring each of the paths. The program further includes instructions for selecting the path with the best score as the path to route the line from the starting point to the ending point.

The present invention provides numerous technical advantages. A key technical advantage of the present invention is that it provides a method and system for automatically routing a line in a graphics chart while avoiding the symbols in the chart. The present invention provides intelligent line routing so that the resulting chart is aesthetically appealing to a viewer.

The present invention provides another technical advantage of automatically routing a line between points very quickly so that the user of a graphical system employing the present inventive system and method receives nearly immediate feedback on where the line being drawn will be placed.

Another technical advantage of the present line routing system and method is that in situations where it simply is not possible to avoid all symbols in a chart when routing a line from a first point to a second point, a line that must pierce a symbol in the chart will do so in such a way so as to minimize its deterrence to the overall aesthetics of the chart.

Yet another technical advantage of the present invention is that when a new symbol is placed on an existing line in a chart, the present system and method will reroute the line so as to avoid the new symbol.

BRIEF DESCRIPTION OF THE DRAWINGS

For a more complete understanding of the present invention and advantages thereof, reference is now made to the following descriptions taken in conjunction with accompanying drawings in which like reference numbers indicate like features and wherein:

FIGS. 10A and 10B illustrate the CorridorPlaneSweep function of the present invention;

DETAILED DESCRIPTION OF THE INVENTION

Preferred embodiments of the present invention are illustrated in the FIGURES, like numerals being used to refer to like and corresponding parts of the various drawings.

Figure 1:
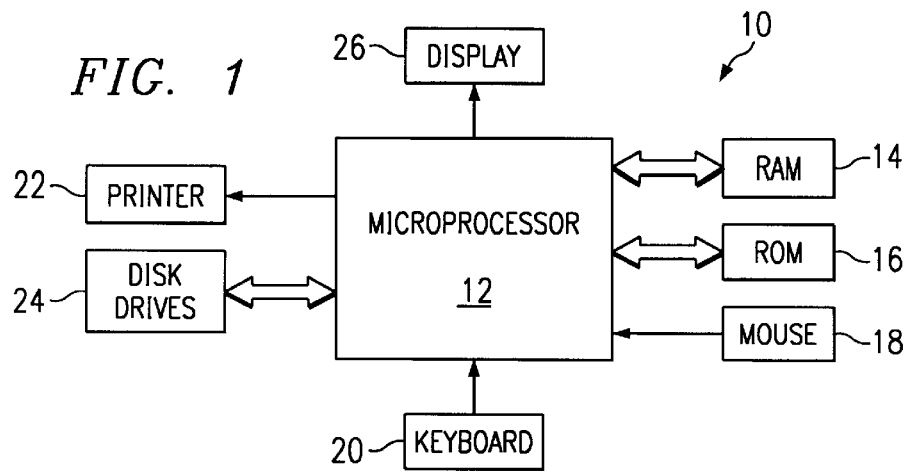
FIG. 1 illustrates a schematic block diagram for a computer system that may be employed in practice of the present invention.

FIG. 1 illustrates computer system 10 for implementing the present invention. Computer system 10 is adapted to execute any of the well known, MS-DOS, PC-DOS, OS2, MAC-OS, or Windows™ operating systems. Computer system 10 includes a processor 12, random access memory (RAM) 14, read only memory (ROM) 16, mouse 18, keyboard 20, and output devices, such as printer 22, disk drive 24, and display 26. The present invention provides a software computer program that may be stored in RAM 14, ROM 16, or disk drives 24, that is executed by microprocessor 12. The present invention is adapted for implementation in many computer languages such as, for example, C or C++, that may be compiled based on the instructions of the desired computer operating system.

Operation of the present invention is described hereinafter, and where appropriate, in connection with flow charts. Those of ordinary skill in art can readily convert the concepts described and represented by the flow charts into computer implemented instructions executable by a processor for implementing the present invention. Additionally, the present line routing system and method is a feature provided by ABC FlowCharter 4.0 from Micrografx, Inc. of Richardson, Tex. 75081.

Figure 2A:
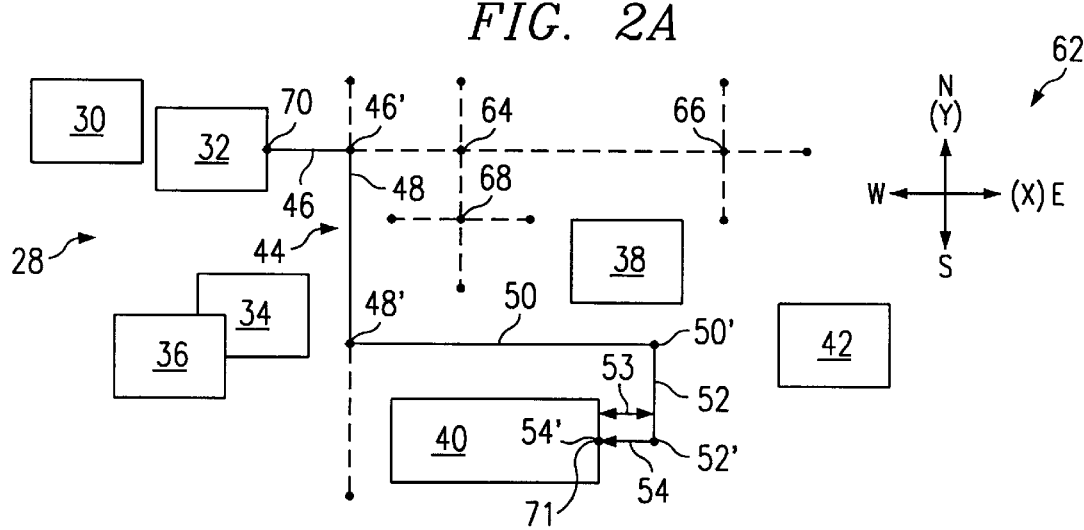
FIGS. 2A and 2B illustrate a graphics chart and the operation of the present invention in routing a line through symbols in the chart.
Figure 2B:
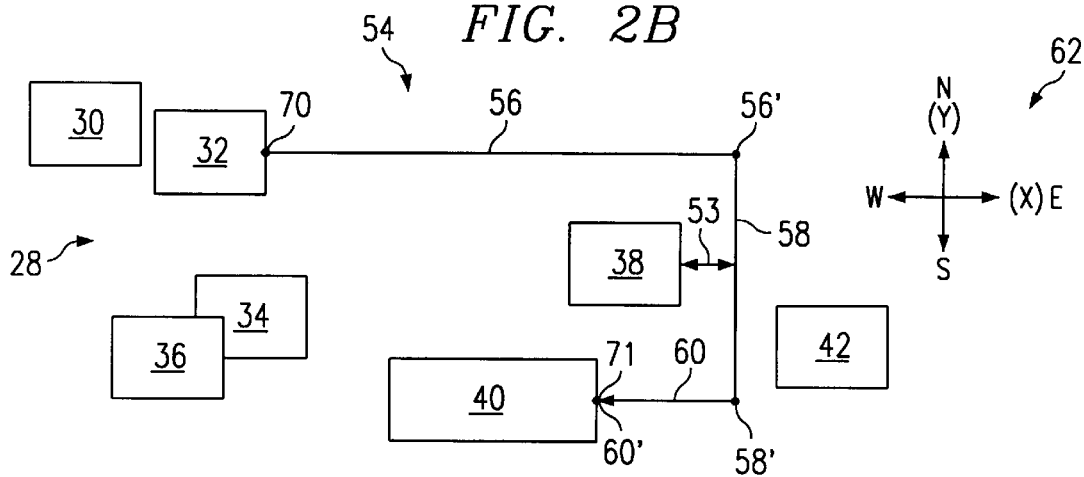

FIGS. 2A and 2B illustrate the problem solved with the present line routing system and method. FIG. 2A shows graphics chart 28 containing symbols 30, 32, 34, 36, 38, 40, and 42 and line 44. In FIG. 2A the symbols are rectangular shapes that represent a rectangular "bounding box" for each symbol in chart 28. To accommodate routing a line through symbols of varying shapes, the present invention defines a rectangular bounding box for each symbol regardless of the symbol's actual shape. The term symbol hereinafter will be used to refer to the bounding box as well as the shape within the bounding box. The present automatic line routing system and method may be used to route a line between any two points, regardless of whether the points exist within the bounds of or lie on the edge of a symbol. In the example of the present invention represented by chart 28 in FIG. 2A, line 44 is a possible line that routes from symbol 32 to symbol 40 without piercing any other symbol in chart 28. Line 44 also represents a possible path from symbol 32 to symbol 40. In chart 28, symbol 32 will be referred to as the starting symbol and symbol 40 will be referred to as the ending symbol. FIG. 2A shows an example where it is desirable to route line 44 from starting symbol 32 to ending symbol 40 while avoiding all other symbols in chart 28.

One type of criteria that may be used for determining the "acceptability" or score of a line routed between a starting symbol and an ending symbol is the number of segments comprising the line as well as whether any other symbols in the chart are pierced by the line. For example, line 44 in FIG. 2A comprises five segments including segments 46, 48, 50, 52, and 54. Alternatively, line 44 may be viewed as having five points including points 46', 48', 50', 52' and 54', which correspond to the end of each segment. Using either of these methods, the "score" of line 44 as shown in FIG. 2A would be five.

FIG. 2B also shows graphics chart 28 having the same symbols as shown in FIG. 2A, but with line 54 between starting symbol 32 and ending symbol 40. Line 54 represents another possible path between symbols 32 and 40. Line 54 includes three segments and corresponding points 56 (56'), 58 (58'), and 60 (60'). The score for line 54 in FIG. 2B is therefore three, and between line 54 in FIG. 2B and line 44 in FIG. 2A, line 54 has a lower score and would be the preferred line between starting symbol 32 and ending symbol 40.

FIGS. 2A and 2B also include direction designation 62 that will be helpful in describing the present line routing system and method. Direction designation 62 employs conventional geographic direction designations having north (N), south (S), East (E), and West (W) geographic directions. Additionally, in the coordinate system that will be used in describing the present invention, the X-axis will correspond to the East-West directions, while the Y-axis will correspond to the North-South directions of designation 62.

As an initial matter, it is noted that the number of lines that may be routed between symbol 32 and symbol 40 in chart 28 of FIGS. 2A and 2B is numerous if not infinite. Therefore, the present method and system for routing a line uses "intelligence" so that the resulting line is aesthetically appealing and also can be accomplished in the minimum number of segments.

FIG. 2A illustrates the problem in generating and routing a line from a first point to a second point. For any point along line 44 in chart 28 there are an infinite number of next locations that line 44 may proceed to. For example, at the destination point for each segment in line 44, e.g., point 46', line 44 may proceed to an infinite number of next locations. As an example, line 44 may proceed from point 46' to point 48', point 64, or point 66. These points are just three possible next locations for line 44 and illustrate that getting from symbol 32 to symbol 40 has infinite possibilities. Additionally, at each possible point there are also four directions for the line. The N, S, E, W directions at point 46' for line 44 are shown in FIG. 2A to illustrate this concept.

Proceeding from this point to the destination point of another segment, for example, destination point 48' of segment 48, there are additional directions in which line 44 may be routed plus an infinite number of locations that the line may proceed to. This phenomenon is also illustrated in dotted line format for alternate destination points 64, 66, and 68. Each of these points that can be used in routing a line from symbol 32 to symbol 40 presents possible paths for the line. The possible paths for the line at the end of each segment creates a "tree" of possible paths that may be traveled in trying to get from the current point to the destination point. One key to the present inventive line routing system and method is that it intelligently chooses the segments so that the search for a line between the starting point and the ending point is limited, i.e., not infinite, and done quickly.

Additional nomenclature used in describing the present invention is also illustrated in FIG. 2A. Point 70 on symbol 32 is referred to as the starting point while point 71 (also point 54') is referred to as the ending or destination point for line 44 to be routed through chart 28. In routing a line through a chart, the destination point of each additional segment may be referred to as the new or current point when determining the next location in a line. Therefore, once segment 46 is established, point 46' may be referred to as the "current point."

The present system and method is comprised of two primary functions or subroutines for routing a line between two points. The first function is the intelligent line routing function, to be referred to hereinafter as "IntelliRoute." IntelliRoute gathers and formats the chart specific information that is necessary to route a line between points in the chart. The other primary function in the present line routing system and method is the find path function, which will be referred to hereinafter as "FindPath." FindPath calculates each segment of a line once provided with the appropriate information from IntelliRoute.

IntelliRoute borrows concepts from both computational geometry and artificial intelligence in order to calculate the most desirable orthogonal line that connects two points in a chart. From computational geometry, IntelliRoute borrows the concept of "PlaneSweep," which is a geometric searching method, that takes a list of symbols in a chart and returns an interval map. See, for example, Computational *Geometry, An Introduction*, by Preparata and Shamos, 1985, Springer-Verlag. In IntelliRoute, a modified PlaneSweep is used and is referred to as the CorridorPlaneSweep that takes a list of symbols in a chart and returns a list of open corridors across an active rectangle, hereinafter referred to as "rectActive." This list of open corridors is simply a list of integers. The concept of rectactive and CorridorPlaneSweep will be further described hereinafter in discussions relating to FIGS. 10A, 10B, and 11.

Additionally, from artificial intelligence, IntelliRoute uses the ideas of recursion and goal seeking. IntelliRoute is greatly simplified by using recursion. Only one segment of a line, e.g., segment 46 or line 44 of FIG. 2A, is calculated by FindPath, and then FindPath calls itself recursively back to IntelliRoute to determine whether the current path should be abandoned and also to gather the necessary data so that FindPath may calculate the next segment in the line of path. Hereinafter the terms "line" and "path" will be used synonymously.

At each destination point of a segment, e.g., points 46' and 48', there are virtually an infinite number next locations for the line to proceed in. Therefore, FindPath must choose from a list of "best guesses" and calculate the next segment using that guess. The list of best guesses is determined based on the relationship between the current point and the ending point and the current direction and the ending direction for the specific chart. "Direction," as that term is used in the present invention, will be described in discussions relating to FIGS. 8A–8C hereinafter. At the end of IntelliRoute, it appears that a tree of possible segments for a line from a starting point to an ending point has been searched, with the exception that there was no tree to begin with, it was created as it was searched. Each possible path has a score associated with it based on the number of segments or points and the number of symbols that had to be "broken through" to complete the line. The best path provides the line with the lowest score.

To minimize the number of possible paths searched by IntelliRoute and FindPath, IntelliRoute and FindPath perform several checks while calculating the routing of a line to make sure it does not enter into infinite loops or take too long to complete a line. Some of these checks are as follows:

Deadlock—if the current point in a line is the same as two points ago in the line then deadlock has occurred.

Infinite—the recursion level for

Recursion IntelliRoute through FindPath is limited to, for example, fifteen.

Breakout—when there are no open corridors returned by the CorridorPlaneSweep a predetermined number of times, a new segment is still created ignoring the fact that there is no open corridor.

Best Score—the score of the line being drawn is always checked against the best score of all previously calculated lines to determine if the current line being evaluated should be abandoned.

Additionally, IntelliRoute and FindPath have some other modifications that account for chart specific layouts. For example, symbols that surround both the starting and ending points are ignored in routing a line between the points. Other modifications and concepts of the present invention will be described hereinafter.

The FindPath function calculates an entire line recursively. It does so by performing a CorridorPlaneSweep on an active area to find open corridors in the active area. Each of the corridors represents a possible route for a segment in the line. Then, by finding the relationship between the current and ending points, the current and ending directions, and the location of the open corridors; FindPath calculates a list of possible next segments for the line along with the associated costs for each of those segments. FindPath sorts the possible segments based on their proximity to an ideal value and a given corridor is selected thereby establishing the next segment in a line. From the end of this segment, a new direction is calculated for the next possible segment. If the line from the starting point to the destination point is not completed, then all the possible paths are iterated through by calling IntelliRoute until a path is found. Therefore, IntelliRoute calls FindPath, which in turn calls IntelliRoute, which calls FindPath, until the best line is routed between the starting point and the ending point.

Figure 3:
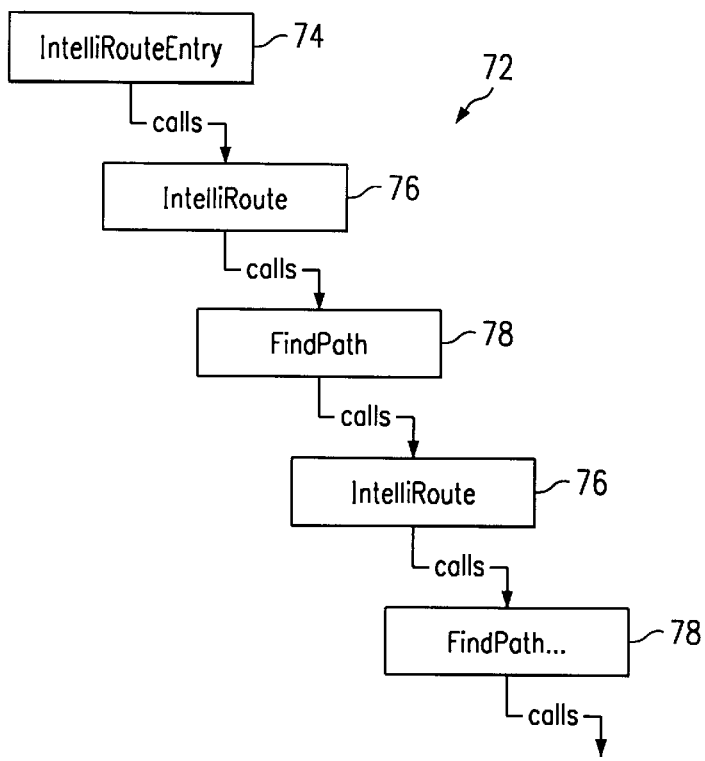
FIG. 3 illustrates an exemplary top-level flow chart for the present line routing system and method.

FIG. 3 is a top-level overview of the present line routing system and method and illustrates the relationship between IntelliRoute and FindPath as previously described. Line routing function 72 is entered wherever a user inputs the proper command to draw a line on a chart. This may be accomplished using standard graphical user interface (GUI) techniques. A user may input line drawing commands through appropriate manipulation of mouse 18 and keyboard 20 in computer system 10 of FIG. 1. Alternatively, line routing function 72 may be entered wherever a user has moved a symbol onto an existing line in a chart and the line must be rerouted in an attempt to avoid the symbol.

Line routing function 72 in FIG. 3 starts at step 74, which is identified as IntelliRouteEntry. Additional detail on IntelliRouteEntry will be provided in discussions relating to FIG. 5 hereinafter. IntelliRouteEntry 74 basically collects the parameters that will be used by IntelliRoute and FindPath to route a line between a starting point and an ending point on a chart. These parameters include, for example, an array of objects in a chart that represent the symbols to be avoided in routing a line in the chart. Once this parametric information is gathered by IntelliRouteEntry 74, IntelliRoute 76 is called.

IntelliRoute 76 takes two points and connects them with an orthogonal line, automatically routing the line to avoid all symbols in its path. IntelliRoute 76 does not attempt to search through all possible paths for a line, but rather chooses the "best" path given the time allotted for determining a path.

Once IntelliRoute 76 is complete, a list of points representing a polyline and the score for that line results. IntelliRoute step 76, in turn, then calls FindPath 78, which in turn calls IntelliRoute 76, which in turn calls FindPath step 78 until an acceptable line between the starting point and ending point is calculated. The recursions of IntelliRoute 76 and FindPath 78 will be further described hereinafter.

As previously noted, the present line routing system and method uses a scoring system to determine whether a "good" or the "best" path has been found. Many types of scoring systems may be employed to judge the acceptability of a line through a chart. In one embodiment of the present invention, the scoring system includes the number of points (P) in the line, e.g., points 46', 48', 50', 52' and 54' in line 44 in FIG. 2A, and the number of symbols that the line "breaks" (B). Each possible line is given a score and that score is calculated by using equation (1):

$$Score=(P+(B*6)) \quad (1)$$

The best line is the line with the lowest score. Therefore, if a line must pierce a symbol, then the score for that line automatically includes six points. The number of other points in that line is added to this giving the resulting score for the line. It is noted that the points for piercing a symbol is not limited to the amount specified in equation (1), but rather many appropriate amounts will suffice to account for the undesirability of piercing a symbol in routing a line through a chart.

Using the examples shown in FIGS. 2A and 2B, neither line 44 nor 54 pierces any symbols so neither line suffers the six points for piercing a symbol. As previously discussed, line 44 in FIG. 2A has a score of five represented by points 46', 48', 50', 52' and 54', while line 54 in FIG. 2B has a score of three represented by points 56', 58' and 60'. Therefore, line 54 is preferred over line 44 and IntelliRoute will choose line 54 to connect starting point 70 to ending point 71.

Figure 4:
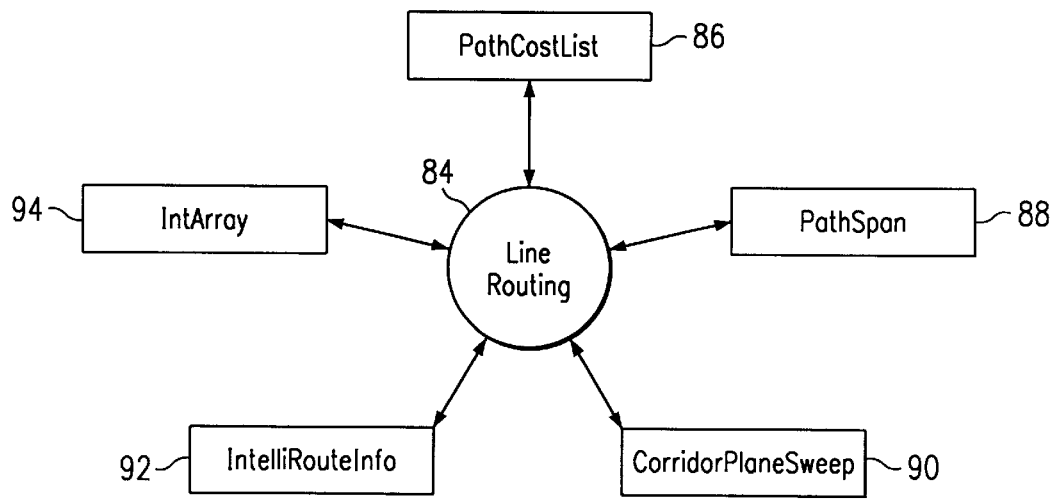
FIG. 4 shows an exemplary relationship of classes used with the present system for line routing.

FIG. 4 illustrates an exemplary relationship between different classes of objects used by IntelliRoute 76 and FindPath 78 in routing a line between two points. Line Routing function 84, also line routing function 72 in FIG. 3, is comprised of the IntelliRoute and FindPath functions as previously described. Line routing function 84 interfaces with and creates PathCostList 86, which contains a list of all possible paths for a line and the costs associated with each path.

PathSpan 88 also provides information to line routing 84 and defines how wide an area is available for routing a line in the chart and also limits the length of any segment in a line. As will be described hereinafter, PathSpan 88 is a function of the current and destination point on a line. CorridorPlaneSweep 90 identifies the open "corridors" in a chart for routing a line. IntelliRouteInfo 92 is the state data of line routing 84. IntelliRouteInfo 92 keeps track of where the current point is in relation to past lines and the destination point, what the best score is, and many other parameters important to line routing 84. IntArray 94 is an array of integers used in routing a line between a starting and an ending point. For example, PathSpan 88 and CorridorPlaneSweep 90 calculate open spaces in a chart and IntArray 94 may be used to store those calculations. IntArray 94 may be implemented as a standard integer array.

It is noted that the names of the classes in FIG. 4 is not intended in a limiting sense, but rather the use of descriptive class names may help facilitate an understanding of the present inventive system and method. In implementing the present invention, other class names may be used without deviating from the scope or spirit of the present inventive line routing system and method.

Figure 5:
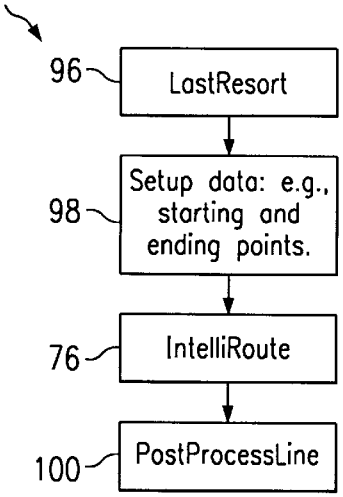
FIG. 5 is an exemplary flow chart for the IntelliRouteEntry function in accordance with the present invention.

FIG. 5 shows additional detail on IntelliRouteEntry step 74 of FIG. 3. As previously described, IntelliRouteEntry 74 provides some preprocessing of the information for a given chart for use by IntelliRoute 76 and FindPath 78. IntelliRouteEntry 74 collects the parameters necessary for routing a line in a chart.

IntelliRouteEntry includes initially "LastResort" step 96. LastResort 96 uses only the two points being connected and calculates a line and the score for that line ignoring all symbols in a chart except for the symbols connected to each point when the points are connected to a symbol. The line generated by LastResort 96, therefore, suffers five points for every symbol in a chart that it pierces. LastResort 74 does not try to avoid the symbols in the chart, but rather takes the most direct path between the points while maintaining the minimum spacing and other parameters specified for the chart to come up with an initial score. The LastResort score represents the best score initially for IntelliRoute 76 and FindPath 78. Additionally, in some limited circumstances, the score of the line generated by LastResort 96 may be the best possible secure, e.g., when the starting and ending points are on the same vertical or horizontal plane without intervening symbols therebetween. In such situations, LastResort 96 knows that this score can never be beaten and it is not necessary to proceed to the other steps of IntelliRoute 76 or FindPath 78. IntelliRouteEntry 74 performs LastResort 96 first hoping that all other calculations may be avoided.

IntelliRouteEntry 74 in FIG. 5 next includes setup data step 98. This step includes gathering the data associated with a particular chart. This data includes, for example, an array of objects in the chart that represent the symbols to be avoided in drawing a line. These parameters also include the minimum spacing (LineSpacing) for the chart as represented by reference number 53 in FIGS. 2A and 2B, the starting and ending points, the starting and ending directions, as well as a time limit (optional) for drawing the line between the starting and ending points. Once the data for a chart is compiled, the flow of IntelliRouteEntry 74 proceeds to IntelliRoute step 76.

Step 76 was previously described in discussions with respect to FIG. 3 and additional detail will be provided hereinafter. Once IntelliRoute step 76 has been completed, then the flow returns back to IntelliRouteEntry 74 where PostProcessLine step 100 may be called to correct for irregularities in the completed line. Because IntelliRoute 76 and FindPath 78 determine a path between two points using "guesses" as to the best way to proceed, some irregularities in the resulting line may result that should be corrected.

Figure 6:
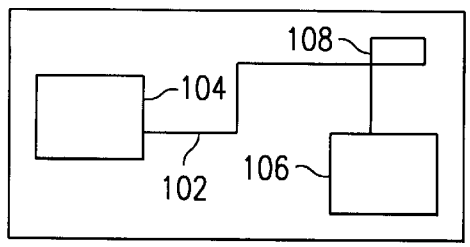
FIG. 6 illustrates a loop problem corrected by the present invention.

FIG. 6 illustrates one type of irregularity that may be corrected by PostProcessLine step 100 in IntelliRouteEntry 74. A loop irregularity exists in line 102 connecting symbols 104 and 106. Line 102 includes loop 108 that can be eliminated by PostProcessLine step 100 of IntelliRouteEntry 74 so that a smooth line is formed.

Figure 7:
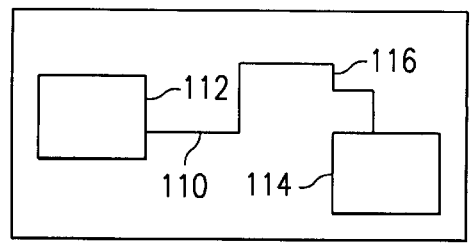
FIG. 7 shows a jagged line problem corrected by the present invention.

FIG. 7 illustrates another line irregularity that may be eliminated at PostProcessLine step 100 of IntelliRouteEntry 74. Line 110 in FIG. 7 between symbols 112 and 114 includes jagged portion 116. PostProcessLine step 100 will remove jagged portion 116 from line 110 so that a smooth aesthetically appearing line is formed.

Also, PostProcessLine step 100 of IntelliRouteEntry 74 may also eliminate unnecessary points in a line. Unnecessary points in a line occur, for example, in a series of three segments with the second segment of the line having a length of zero. This line effectively has one segment and PostProcessLine step 100 identifies this situation and will eliminate the segment having no length.

Figure 8A:
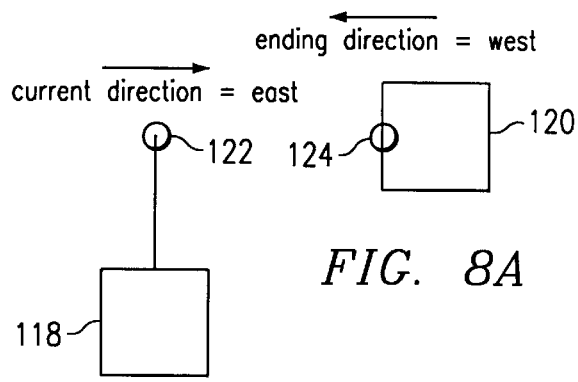
FIGS. 8A–8C illustrate the direction conventions used in the present system and method.
Figure 8B:
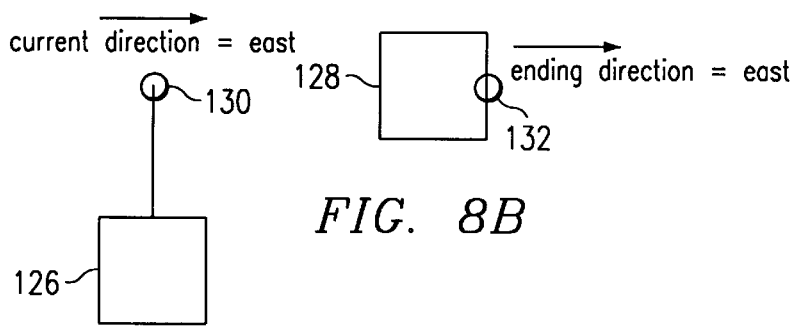
Figure 8C:
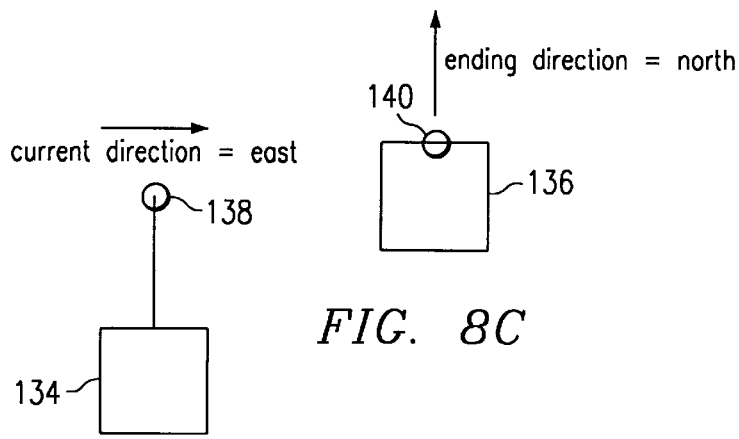

Before proceeding with additional descriptions of IntelliRoute 76 and FindPath 78, a description of the conventions used for "direction" in the present system and method is appropriate. FIGS. 8A through 8C will be used to describe the conventions used in this detailed description of the invention. FIG. 8A includes symbols 118 and 120 and current position 122 and ending position 124. The current direction at current position 122 is "east" because in order to get from current position 122 to ending position 124 it is necessary for current position 122 to move east (Note: direction designation 62 in FIGS. 2A and 2B). Additionally, the ending direction for ending position 124 is west because position 124 is on the west side of symbol 120.

Similarly, FIG. 8B includes symbols 126 and 128 and current position 130 and ending position 132. Using the same direction conventions, the current direction at current position 130 is east because it will be necessary for current position 130 to move in an easterly direction to reach ending position 132. Ending position 132 is east because it is on the east side of symbol 128.

Finally, in FIG. 8C are shown symbols 134 and 136 and current position 138 and ending position 140. Following the conventions described above, the current direction at current position 138 is east as current position 138 must move to the east to reach ending position 140. Ending direction at ending point 140 is north because ending position 140 is on the north side of symbol 136. It is noted that these conventions for direction and position are not intended in a limiting sense as other systems may be used without deviating from the scope or spirit of the present invention.

Figure 9:
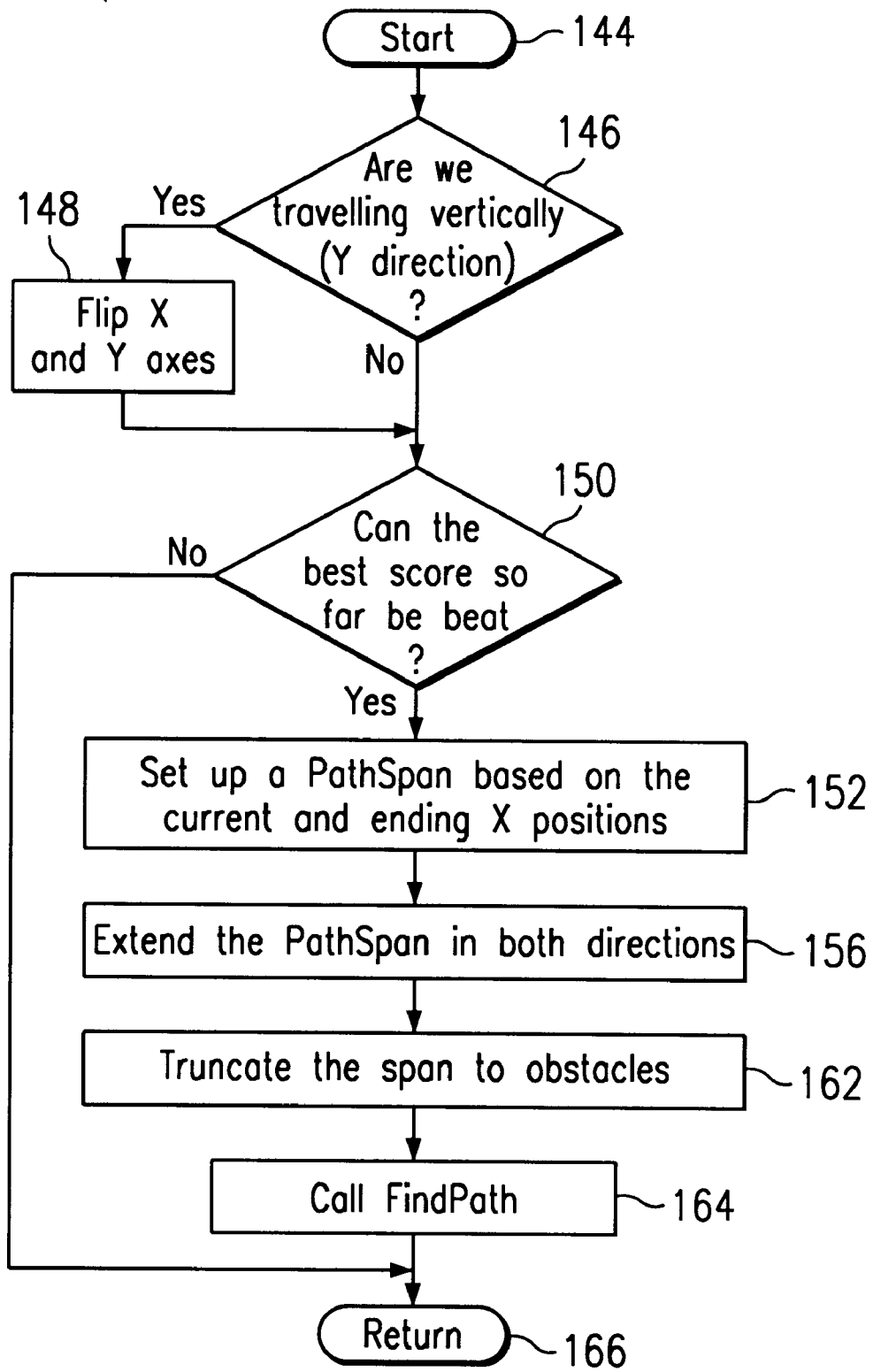
FIG. 9 provides an exemplary top-level flow chart for the IntelliRoute function of the present invention.

FIG. 9 provides a flow chart containing additional information on IntelliRoute 74. IntelliRoute 74 is entered from either IntelliRouteEntry 74 or from FindPath 78. IntelliRoute 76 begins at step 144 when it is called by one of these two functions. At step 146 a query is made as to whether the direction of the current search for the next segment in a line is traveling in a vertical (Y) direction. As will be described in discussions relating to FIGS. 10A, 10B, and 11 hereinafter, in order to minimize the complexity of IntelliRoute 76 and FindPath 78, they search only in the horizontal (X) direction. If the answer at step 146 is yes, then the current search is traveling in a vertical direction and the flow proceeds to step 148 where the X and Y axis for the chart are flipped so that the search for the next segment may proceed in the horizontal (X) direction. The effects of flipping the X and Y axes will be described in discussions relating to FIG. 11 hereinafter.

From either step 146 or step 148 a query is made at step 150 as to whether the best score of all the lines previously calculated can be beat. As previously noted, the present method and system for routing a line employs a series of "checks" to minimize the searching and calculations that it performs in routing a line from a starting point to an ending point. As will be evident in the following discussions, IntelliRoute 76 is entered several times in routing a line from a starting point to an ending point. The query at step 150 is made for each pass to determine if the remainder of IntelliRoute 76 is necessary. IntelliRoute 76 prevents unnecessary calculations by continually checking whether a given path or line can beat the best score of all the lines previously calculated. If the best score cannot be beat at step 150 then IntelliRoute 76 may be exited, with control returning to IntelliRouteEntry 74 and PostProcessLine step 100, see FIG. 5. If at step 150 the best score so far can be beat by the current line, then the flow proceeds to step 152 where CorridorPlaneSweep 90 initiates.

Figure 10B:
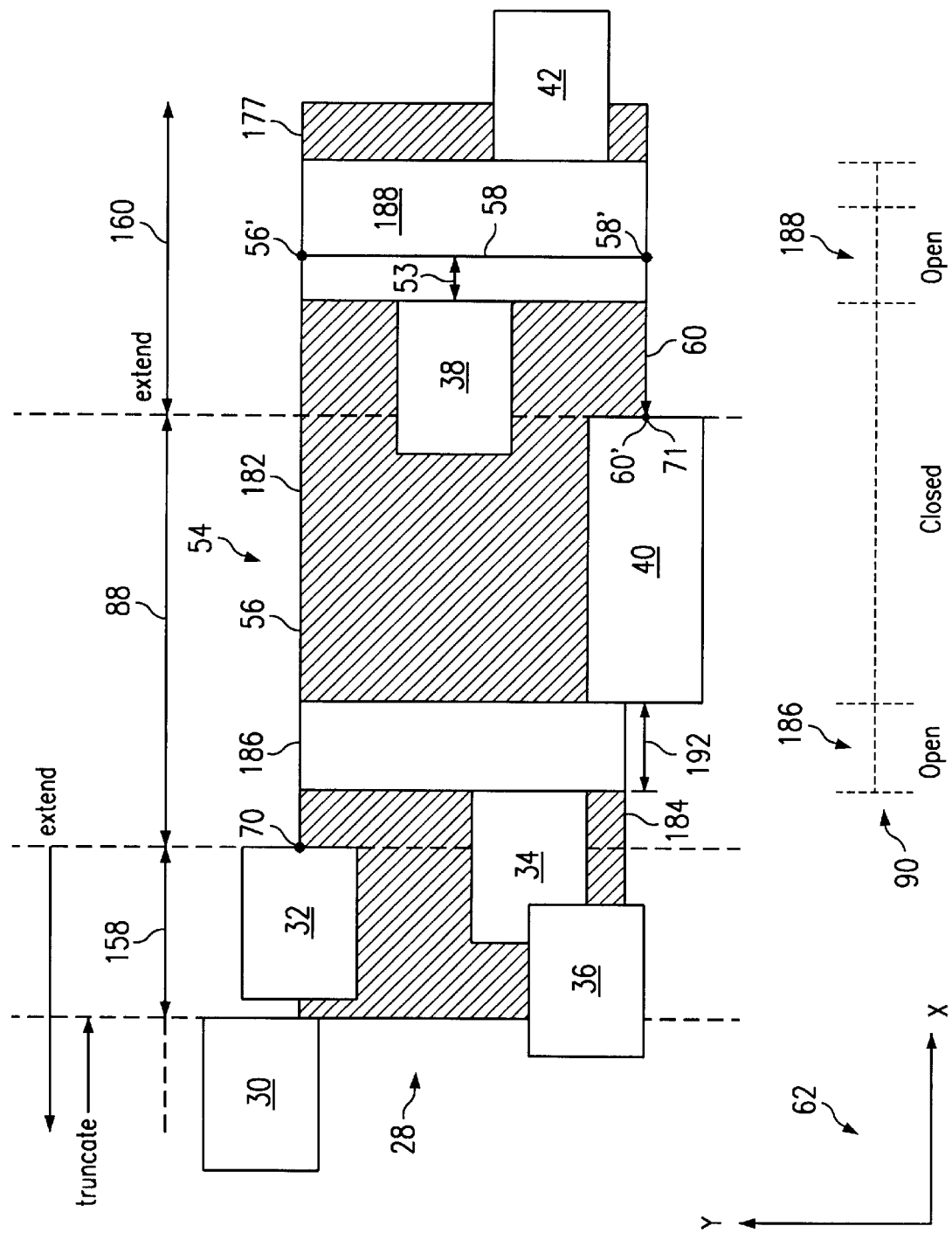

FIGS. 10A and 10B illustrate CorridorPlaneSweep 90 in accordance with the present invention. FIGS. 10A and 10B include substantially the same information as was shown in FIGS. 2A and 2B. Each FIGURE includes the symbols of chart 28. Assume initially that the current position in chart 28 is point 70 and the ending position is point 71. (Point 70 also happens to be the starting point for a line between points 70 and 71.) At step 152 in IntelliRoute 76 in FIG. 9, PathSpan 88 as shown in FIGS. 10A and 10B is established based on the current and ending X positions, i.e., the X coordinates of points 70 and 71 as shown in FIGS. 10A and 10B.

Next, at step 156 in IntelliRoute 78 of FIG. 9, PathSpan 88 is extended in the X direction by outer range 158 and outer range 160 as shown in FIGS. 10A and 10B, which basically triples the size of PathSpan 88. By extending PathSpan 88 to include outer ranges 158 and 160, corridors outside of the current position 70 and ending position 71 may be searched and identified. Next, at step 162 the extended PathSpan, including PathSpan 88 and outer ranges 158 and 160, is truncated by any symbols that represent obstacles to the extended PathSpan. For example, symbol 30 in FIG. 10A represents an obstacle to outer range 158 so outer range 158 is truncated to the edge of symbol 30 as shown. Outer range 158 is truncated because the obstacle represented by symbol 30 is at an X position that is less than current position 70 when ending position 71 is at greater than the current X position 70, i.e., it will not be necessary to route a line beyond symbol 30 to get from point 70 to point 71.

Returning to FIG. 9, at step 164 IntelliRoute 76 calls FindPath 78, which will be described in discussions relating to FIGS. 12A through 12H. FindPath 78 will in turn call back to IntelliRoute 76, and at step 166 IntelliRoute 76 will return to PostProcessLine step 103 in IntelliRouteEntry 74 as shown in FIG. 5. Alternatively, step 166 in IntelliRoute 76 may be reached once step 150 determines that the best score so far at step 150 cannot be beat.

FIGS. 12A through 12F provide additional information on FindPath 78. FindPath 78 begins at step 170 when it is called by IntelliRoute 76. The purpose of FindPath 78, as previously described, is to determine and calculate the next segment in the line being drawn between a current position and an ending position. It is noted that the next segment may not necessarily reach the ending point for a line. At step 172 the recursion count (RecursionCount) through FindPath 78 is incremented by one. As previously noted, in order to avoid infinite recursion, the number of times FindPath 78 may be called by IntelliRoute 76 in order to calculate the next segment in a line is limited to a reasonable number, for example fifteen. This in turn, limits the number of segments between a starting point and an ending point. Next, at step 174 the current score for the line being drawn is incremented by one. This is done because FindPath 78 calculates the next segment in the line so the score for that line must receive another point for that segment Once the score for the current line is incremented at step 174, FindPath 78 proceeds to step 176 where rectActive is calculated. RectActive is shown as hatched area 177 in FIGS. 10A and 10B. RectActive 177 is defined by extended PathSpan 88 as determined by IntelliRoute 76 steps 152, 156, and 162 in FIG. 9, and by the current Y point and the ending Y point e.g., point 70 and 71 respectively. Next, at step 178 the local path cost list (PathCostList) 86 (see FIG. 4) is cleared as a new segment for a line is being calculated so PathCostList 86 from any previous segment calculations and iterations through FindPath 78 must be cleared.

At step 180 CorridorPlaneSweep 90 (see FIG. 4) looks for open paths or corridors in rectactive. Using the example of FIGS. 10A and 10B where the current position is point 70 and the ending point is 71 and using rectactive 177, CorridorPlaneSweep step 180 involves moving away from point 70 along top 182 of rectactive 177 and "looking down" to bottom 184 of rectActive 177 to see whether any symbols are between top 182 and bottom 184. By performing CorridorPlaneSweep 90 at step 180 using rectactive 177 in FIGS. 10A and 10B, corridors 186 and 188 are identified in rectactive 177 for current position 70 and ending position 71. These corridors represent a "clear path" for CorridorPlaneSweep 90 from top 182 to bottom 184 of rectActive 177. FindPath 78 uses these open corridors to determine the length of the segment being calculated. For example, assume point 70 in FIG. 10A is the current point and open corridors 186 and 188 have been identified at step 180. The "top" of each of these corridors represents a possible ending point for the segment beginning at point 70. Therefore, two possible segments from point 70 are from point 70 to point 46' forming segment 46 or from point 70 to point 56' forming segment 56 (see FIG. 10B). The concept behind this is that once the current segment is calculated, then the line should proceed in an open corridor. Therefore, the open corridors are used to calculate the current segment.

Next, at step 190 the corridors found at step 180 that are in the outer ranges, e.g., outer ranges 158 and 160 in FIG. 10A, are trimmed as required. Trimming involves determining whether the width of an open corridor or path is greater than two times the minimum line spacing (LineSpacing) for the chart. In the example of FIG. 10A this involves determining whether width 194 of corridor 188 that is in outer range 160 is greater than two times minimum spacing 53 for chart 28. If the corridor width is greater than two times Line Spacing 53, then the corridor will be trimmed to equal two Line Spacing 53. This situation may be illustrated in FIGS. 10A and 10B where corridor 188 must be trimmed down to two times LineSpacing 53.

Figure 12A:
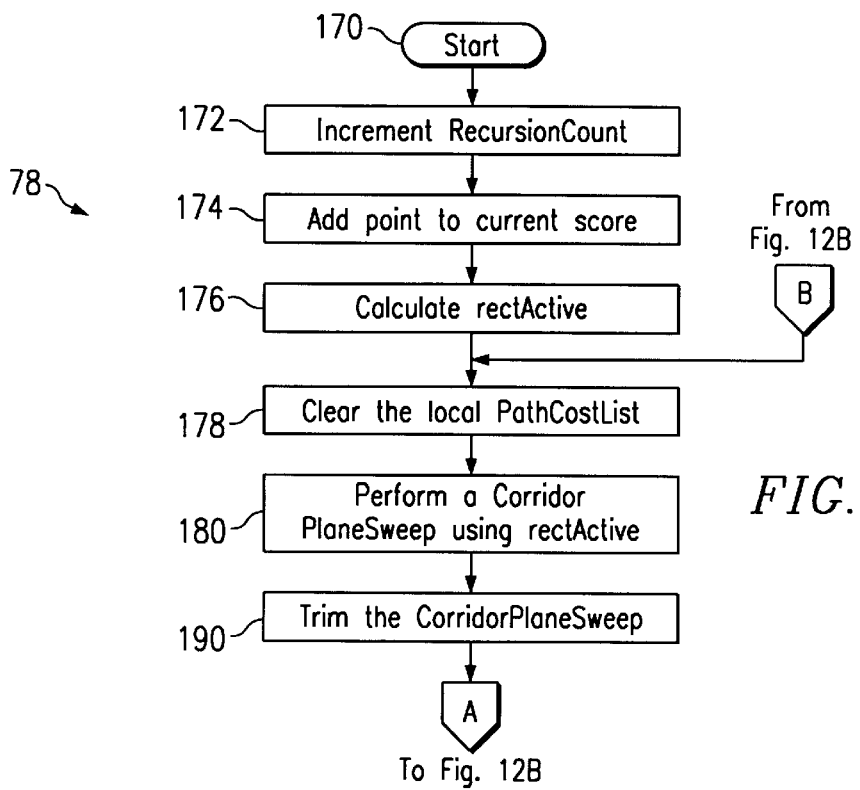
FIGS. 12A–12H illustrate an example of the FindPath function of the present invention.

The result of steps 180 and step 190 for FindPath 78 in FIG. 12A is CorridorPlaneSweep 90 shown along the bottom of FIGS. 10A and 10B. CorridorPlaneSweep 90 simply comprises integer values representing "open" and "closed" corridors in rectactive 177 with corridor 188 trimmed down to two times the minimum line spacing for chart 28. CorridorPlaneSweep 90 may be stored in IntArray 94 as described in discussions relating to FIG. 4.

Figure 11:
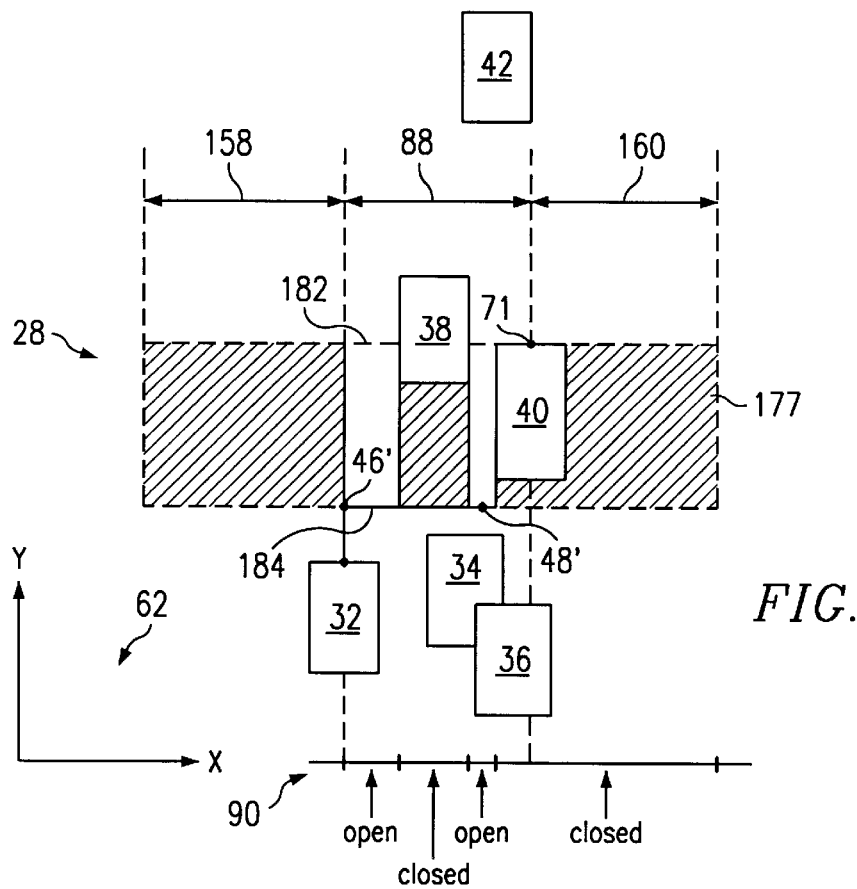
FIG. 11 illustrates the CorridorPlaneSweep of FIGS. 10A and 10B with the coordinate axis rotated.

Before proceeding to the next step in FindPath 78 a discussion of FIG. 11 as it relates to FindPath 78 in FIG. 12A is appropriate.

FIG. 11 illustrates the results of step 148 in IntelliRoute 76. As previously noted at step 148 the X and Y axes are flipped for the next pass through IntelliRoute 76. FIG. 11 contains essentially the same information as chart 28 in FIGS. 10A and 10B, but having the information flipped on the X and Y axes. In the example of FIG. 11, the current position is now point 46' while the ending position is still point 71. RectActive 177 has been formed using these points, PathSpan 88, and outer ranges 158 and 160.

Using rectActive 177 as shown in FIG. 11, CorridorPlaneSweep 90 will search rectactive along bottom 184 to top 182 looking for open corridors in rectActive. These open corridors will be used to calculate segments extending from point 46'. The remainder of IntelliRoute 76 and FindPath 78 may proceed once the function at step 148 is complete. Step 148 allows IntelliRoute 76 and FindPath 78 to be simplified.

Figure 12B:
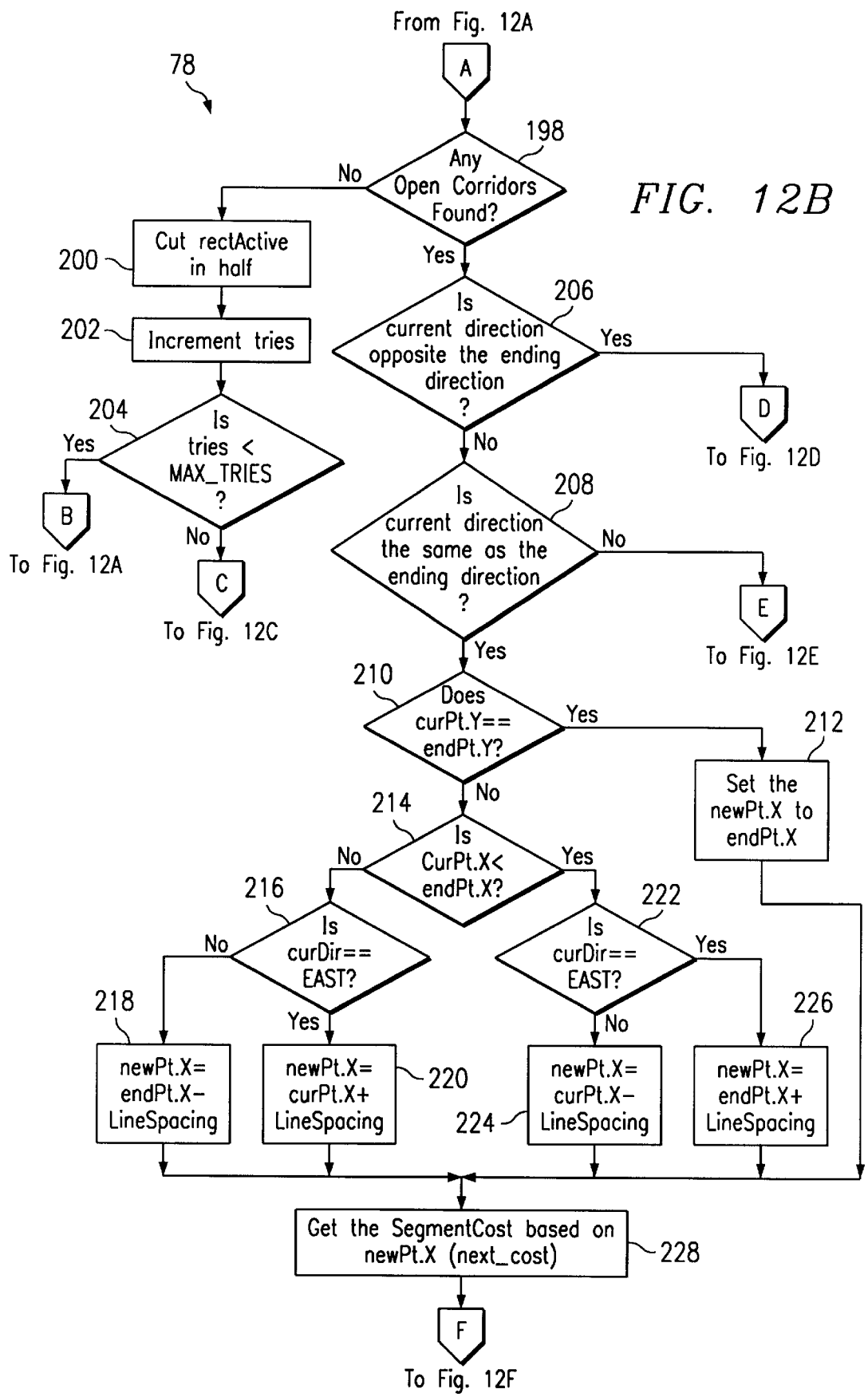

Returning to FindPath 78, FIG. 12B provides additional information on FindPath 78 once CorridorPlaneSweep 90 has searched rectactive for open corridors. At step 198 a query is made as to whether any open corridors have been found in the rectactive. If no open corridors are found, then the flow proceeds to step 200 where the depth of rectactive is cut in half in the Y direction. This is illustrated in FIG. 10A where depth 202 of rectActive 177 is cut in half by line 204. Next, at step 202 the number of "tries", i.e., the number of times an open corridor has been searched in rectactive, is incremented, and at step 204 a query is made as to whether the number of tries is less than the maximum number of tries (MAX_TRIES).

Figure 12C:
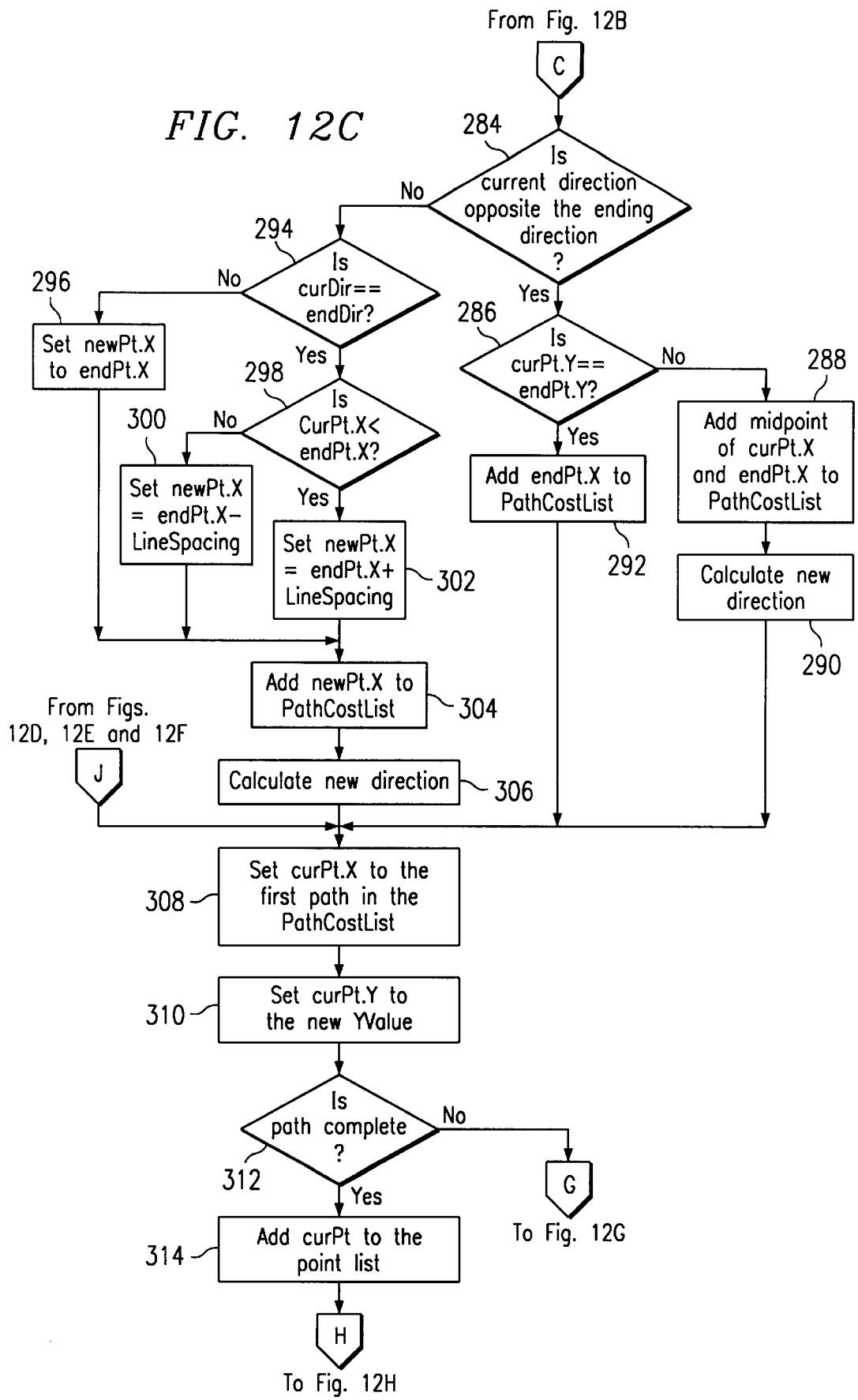

In order to prevent FindPath 78 from searching endlessly for an open corridor in rectactive where one does not exist, the number of times the depth of rectactive will be halved and searched is limited. In one embodiment of FindPath 78, the number of times CorridorPlaneSweep 90 will be performed for a given current and ending positions is three. Therefore, if CorridorPlaneSweep 90 with respect to rectactive has been performed less than the maximum tries, then CorridorPlaneSweep 90 for a smaller rectActive may be attempted and FindPath 78 returns to step 178 in FIG. 12A. The idea behind cutting rectactive in half is that each time rectactive is reduced the likelihood of finding an open corridor in rectactive increases. If, however, rectActive is cut in half three times and still no open corridors are found, then the symbols in the chart must be ignored and FindPath 78 continues as shown in FIG. 12C and as will be described hereinafter.

Figure 12D:
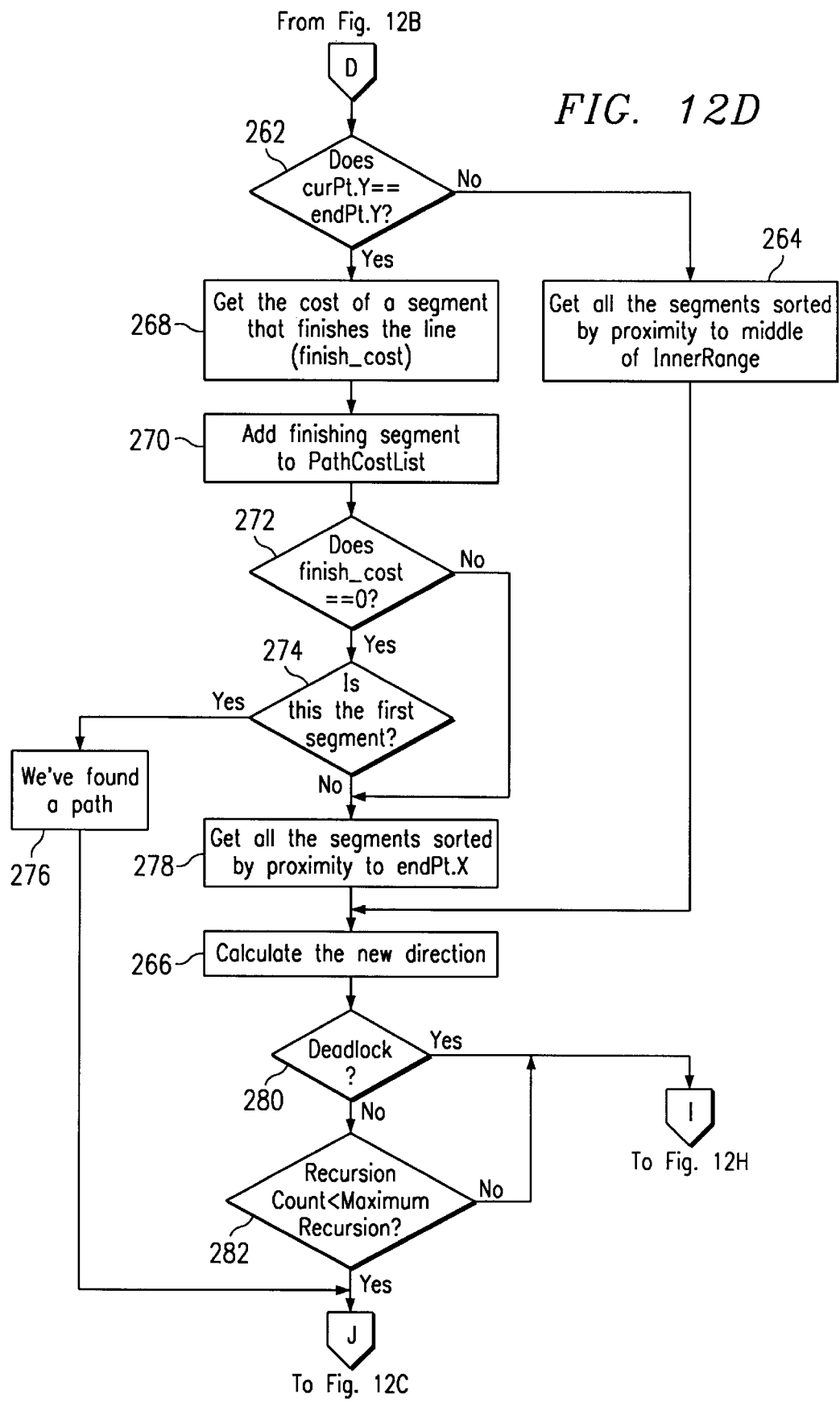
Figure 12E:
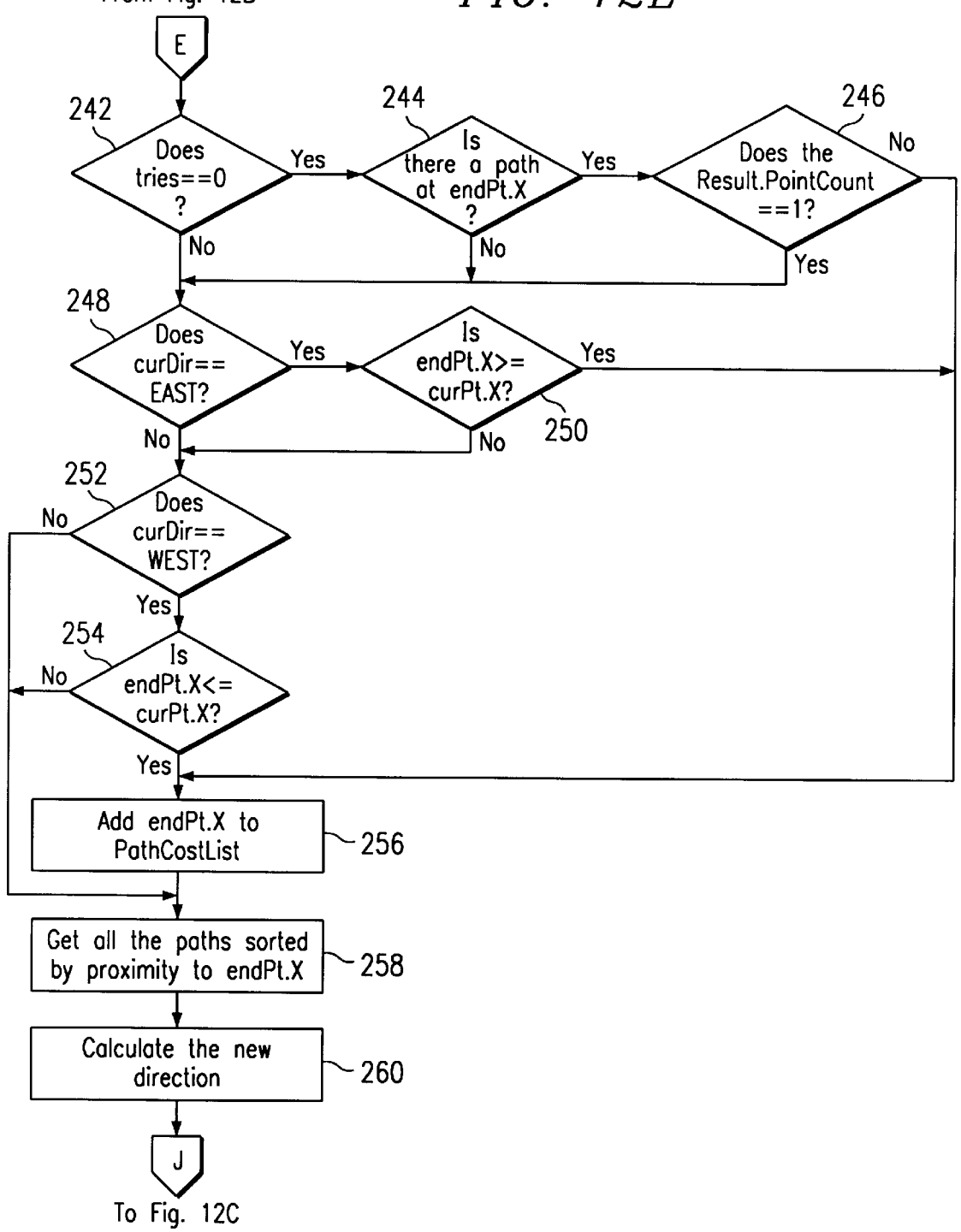

Returning to step 198 and assuming that open corridors have been found in rectActive, the flow proceeds to step 206 where a query is made on the relationship between the current direction and the ending direction. If the current direction is opposite the ending direction then FindPath 78 proceeds as shown in FIG. 12D and as described hereinafter. Alternatively, if the current direction and ending direction are not opposite then the flow proceeds to 208. At step 208 it is known that the current and ending directions must either be the same direction or adjacent directions. At step 208, a query is made as to whether the current direction is the same as the ending direction. If they are not then by process of elimination the current and ending directions are adjacent to one another and FindPath 78 proceeds as shown in FIG. 12E and as described hereinafter.

If the current direction is the same as the ending direction at step 208 then the flow proceeds to step 210 where a query is made as to whether the current Y point (curPt.Y) is equal to the ending Y point (endPt.Y). If the current Y point is equal to the ending Y point then it is known that the two points are on the same horizontal plane and the flow proceeds to step 212. At step 212, the new X point (newPt.X) is set to the ending X point (endPt.X). Now, X and Y coordinates for the new point have been determined and a new segment for a path has been calculated and the line has been completed.

Returning to the query at step 210, if the current Y point is not equal to the ending Y point then the flow proceeds to step 214 where a query is made as to whether the current X point (curPt.X) is less than the ending X point. If the answer is no, e.g., the current X point is greater than the ending X point, then the flow proceeds to step 216.

At step 216 a query is made as to whether the current direction (CurDir) is east. If the current direction is not east then the flow proceeds to step 218 where the new X point is set to the ending X point minus the minimum line spacing (LineSpacing) for the chart. If, however, at step 216 the current direction is east, then the flow proceeds to step 220 where the new X point is set to equal the current X point plus LineSpacing. At this point X and Y points for the new segment have been calculated.

Returning to step 214, if the current X point is less than the ending X point the flow proceeds to step 222 where a query is made as to whether the current direction is east. If the current direction is not east then the flow proceeds to step 224 where the new X point is set to the current X point minus LineSpacing. Alternatively, if the current direction is equal to east at step 222, then new X point is set at step 226 to the ending X point plus Linespacing.

From steps 212, 218, 220, 224, and 226 in FindPath 78 in FIG. 12B, the next segment in a line, e.g., segments 46, 48, etc. in FIG. 10A, have been determined. At step 228 the cost of the new segment (SegmentCost) is determined using an appropriate formula, including, for example, formula (1) above. The cost of (next_cost) the new segment (SegmentCost) is the cost of the enxt segment in routing the line through the chart. An example of the operation of IntelliRoute 76 and FindPath 78 to this point is shown in FIG. 10A, where corridors 186 and 188 have been identified and new segment 46 in the routing of line 44 has been determined. Segment 46 has a set of points and cost and both are stored in PathCostList 86.

Figure 12F:
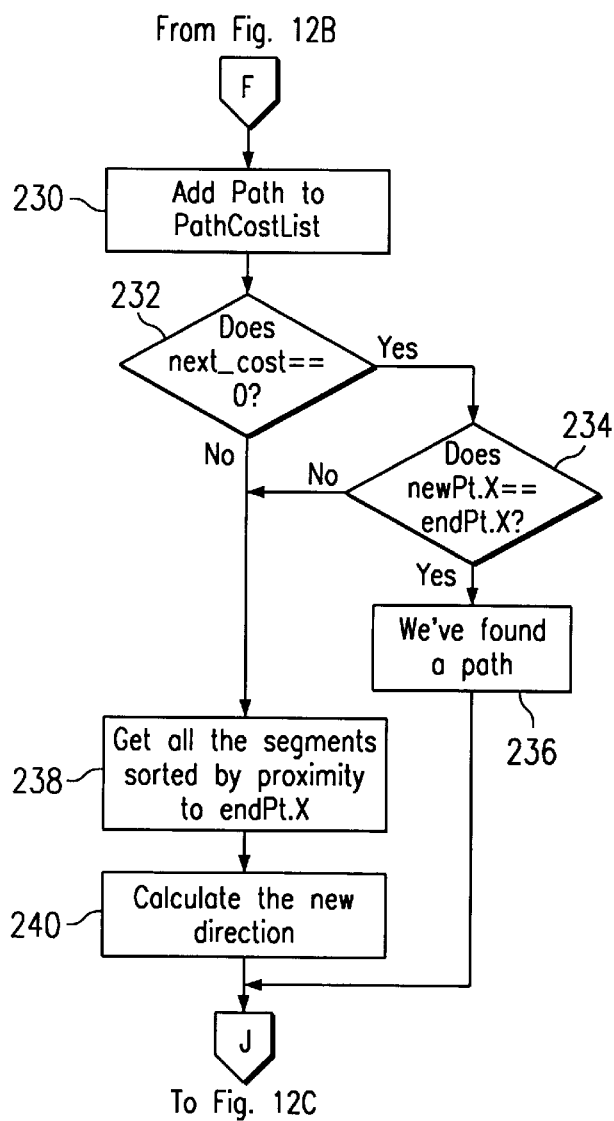

FIG. 12F shows FindPath 78 beginning at step 230, which is entered from step 228 in FIG. 12B once a segment has been found as described in discussions relating to FIG. 12B. At step 230 the segment calculated at steps 218, 220, 224, 226, or 212 in FIG. 12B, and its associated cost are added to PathCostList 86 for the current path. Next, at step 232 a query is made as to whether the segment's cost, next_cost in step 228 in FIG. 12B, equals zero. If the next_cost equals zero then no symbols were pierced in getting from the current point to the new point. If this occurs then the flow proceeds to step 234 where a query is made as to whether the new X point for the new segment equals the ending X point. If the answer to this query is yes then the flow proceeds to step 236 where it is determined that a path from the starting point to ending point is complete. From step 236 FindPath 78 proceeds as shown in FIG. 12C and as will be described hereinafter.

Returning to step 232, if the next_cost for the segment does not equal zero then that segment has pierced a symbol and the flow proceeds to step 238. Similarly, if at step 234 the new X point does not equal the ending X point, then a line from the starting point or to the ending point has not been completed and the flow proceeds to step 238. At step 238, all the segments in PathCostList 86 are sorted by their proximity to the ending X point. At step 240 a new direction for each segment in the PathCostList 86 that gets the line closer to the ending X point is selected. The next direction is chosen at step 240 based on the current and ending direction so that, for example, if the current direction is either east or west then the new direction will be either north or south, and vice versa, so that the path may be completed. This prevents the current path being calculated from retreating on itself. From step 240 FindPath 78 proceeds as shown in FIG. 12C and as described hereinafter.

FIG. 12E provides additional information on FindPath 78 when the current direction and the ending direction are adjacent to one another as illustrated in FIG. 8C. At step 242 a query is made as to whether the number of tries (TRIES) is equal to zero. As previously described in discussion relating to FIG. 12B, FindPath 78 will only try to find an open corridor in rectactive a predetermined number of times and then proceeds to pierce a symbol in getting from the current point to the ending point. If the answer at step 242 is yes, I.e., the original rectActive has been used, then another query is made at step 244 as to whether there is an open corridor in rectActive to ending X point. If the answer to this query is yes, then the flow proceeds to step 246 where a query is made as to whether the resulting point count (Result.PointCount) is equal to one. This results when the segment being calculated is the first segment in a line. If the answer at step 246 is no then the flow proceeds to step 256, which will be described hereinafter.

From either a no answer at step 242 or step 244 or a yes answer at step 246, the flow in FIG. 12E proceeds to step 248 where a query is made as to whether the current direction is east. If the current direction is east then the flow proceeds to step 250 where a query is made as to whether the ending X point is greater than or equal to the current X point. If the answer at step 250 is yes then the flow proceeds to step 256. If the answer at either step 248 or 250 is no, then the flow proceeds to step 252 where a query is made as to whether the current direction is equal to west. If the answer at step 254 is yes then a query is made at step 254 as to whether the ending X point is less than or equal to the current X point. If the answer at step 254 is yes then the flow proceeds to step 256.

At step 256, the length of the current segment being calculated is set to the ending X point and this segment is added to PathCostList 86 thereby completing the current segment. From step 256 or a no answer at steps 252 or 254 the flow of FindPath 78 proceeds to step 258. At step 258 all the segments in PathCostList 86 are sorted by their proximity to the ending X point. At step 260 a new direction for each segment in PathCostList 86 is calculated. FindPath 78 as illustrated in FIG. 12E next proceeds as shown in FIG. 12C and as is described hereinafter.

FIG. 12D provides additional information on FindPath 78 when an open corridor has been found in rectactive and the current direction and the ending direction are opposite directions as determined at step 206 in FIG. 12B. Beginning at step 262 a query is made as to whether the current Y point (curPt.Y) equals the ending Y point (endPt.Y). If the ending Y point does not equal to the current Y point then the flow proceeds to step 264 where all the segments to the open corridors of rectactive are sorted by their proximity to the middle of the inner range (InnerRange) of rectactive. The InnerRange corresponds to PathSpan 88 in the examples shown in FIGS. 10A and 10B. Segments closest to or within the InnerRange are preferred over those outside of the InnerRange, and the segment closest to the center of the InnerRange is the most preferred path. This sorting of segments is stored in PathCostList 86. Next, at step 266 a new direction for each segment in PathCostList 86 is calculated since it was previously determined at step 262 that the current Y point and ending Y point were not equivalent so it will be necessary to route the line in a new direction (e.g., north or south) to complete the line.

Returning to step 262, if the current Y point does equal the ending Y point then the line may be completed by providing a segment from the current X and Y points to the ending X and Y points. At step 268 the cost of that "finishing" segment is calculated (finish_cost). At step 270 the finishing segment and its associated cost are added to PathCostList 86. At step 272 a query is made as to whether finish_cost is equal to zero. If finish_cost does not equal zero then the line is not completed and the flow proceeds to step 278. If, however, finish_cost does equal zero then a query is made at step 274 as to whether this is the first segment in the line. If it is the first segment in the line then the flow proceeds to step 276 where a path is declared to have been found and FindPath 78 proceeds as shown in FIG. 12C and as described hereinafter.

The only way the path can be completed with a finish_cost equal to zero is if the finishing segment is the first segment. This is the basis for steps 272, 274, and 276. If, at step 274 the finish_cost does not equal zero, then the flow proceeds to step 278 where all the segments in PathCostList 86 are sorted by their proximity to the ending X point with the segment closest to the ending X point the preferred next segment. Next, at step 266 a new direction for each segment in PathCostList 86 is calculated as previously described.

Figure 12G:
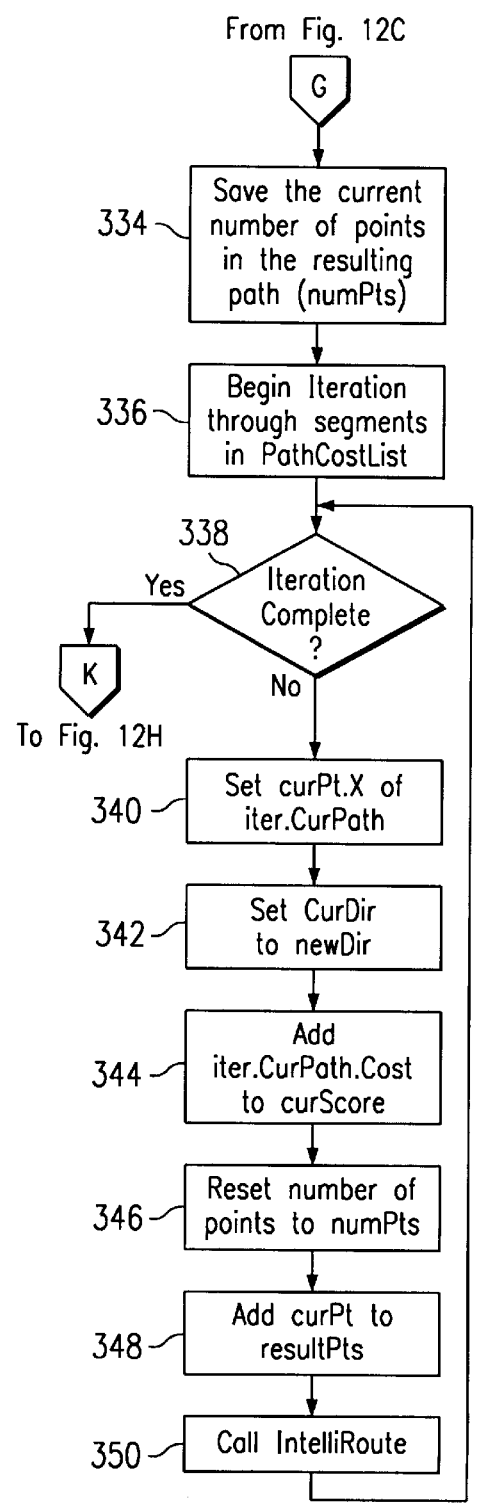
Figure 12H:
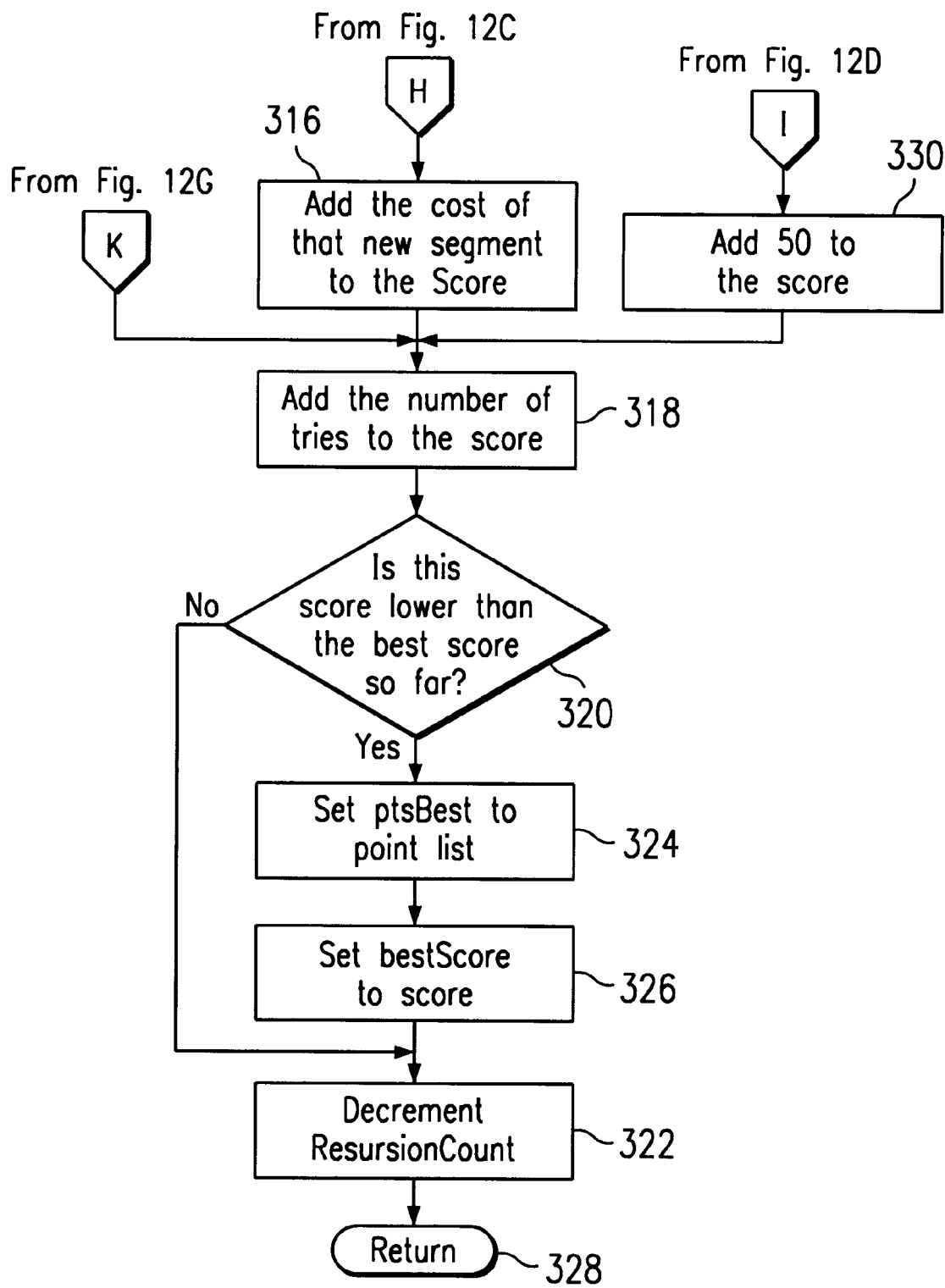

Following step 266, a query is made at step 280 as to whether deadlock has occurred. Deadlock, as previously described, occurs when FindPath 78 attempts to establish the next segment in a line on the line itself. If deadlock occurs then FindPath 78 proceeds as shown in FIG. 12H and as described hereinafter. If deadlock has not occurred, then a query is made at step 282 as to whether the recursion count for the current path exceeds the maximum recursion number, e.g., fifteen. If the recursion count is not less than the allowable maximum, then FindPath 78 proceeds as shown in FIG. 12H and as will be described hereafter. If the recursion count is less than the maximum, then additional segments may be searched and FindPath 78 proceeds as shown in FIG. 12C and as described hereinafter.

FIG. 12C provides additional information on FindPath 78 when there are no open corridors in the current rectactive between the current point and the ending point. FindPath 78 as shown in FIG. 12C begins at step 284 from step 204 on FIG. 12B whenever step 204 determines that no open corridors exist in CorridorPlaneSweep 90 despite halving rectactive 177 the required number of times (TRIES).

At step 284 a query is made as to whether the current direction is opposite the ending direction. If the answer to this query is yes then the flow proceeds to step 286 where another query is made as to whether the current Y point equals the ending Y point. If the answer to this query is no, then at step 288 the midpoint of the current X point and the ending X point (endPt.X) is added to PathCostList 86. This results in splitting the difference between the current X point and ending X point in half, determining that the current segment will extend to this midpoint, and adding this segment to PathCostList 86. At step 290 a new direction for the current segment from the new X point calculated at step 288 is calculated.

Returning to step 286, if the current Y point does equal the ending Y point then the current and ending points are in the same vertical plane and to get to the ending point the current X point must merely be set to the ending X point. This occurs at step 292 where the ending X point is added to PathCostList 86.

Returning to step 284, if the answer to this query is no, i.e., the current direction is not opposite the ending direction, then the flow proceeds to step 294 where another query is made as to whether the current direction is equal to the ending direction (endDir). If the answer at step 294 is no, then the flow proceeds to step 296 where the new X point is set equal to the ending X point. Alternatively, if the answer to the query at step 294 is yes, then the flow proceeds to step 298 where another query is made as to whether the current X point is less than the ending X point. If the answer to that query is no, then at step 300 the new X point is set equal to the ending X point minus the minimum line spacing (Linespacing). If, however, at step 298 the answer is yes, then at step 302 the new X point is set to the ending X point plus LineSpacing.

From either step 296, 300, or 302, a new X point has been calculated and the flow proceeds to step 304 where the new X point is added to PathCostList 86 as the current segment in the line has been calculated. At step 306 a new direction for the segment in PathCostList 86 is calculated similarly to step 290.

Preceding step 308 in FIG. 12C is either steps 290, 292, or 306 in FIG. 12C, steps 276 or 282 in FIG. 12D, step 260 in FIG. 12E, or steps 236 or 240 in FIG. 12F. The commonality of all these steps preceding step 308 is that FindPath 78 has just completed a segment and has calculated a new direction for that segment, with the exception of step 292 in FIG. 12C, which has also completed a path from the starting point to the ending point. At step 308 the current X point is set to the first segment in PathCostList 86. Next, at step 310, the current Y point is set to the new Y value (YValue) for the segment selected at step 308. At step 312 a query is made as to whether the path from the starting point to the ending point is complete. If the answer at step 312 is no then FindPath 78 proceeds as shown in FIG. 12G and as described hereinafter. If the answer at step 312 is yes, then the flow proceeds to step 314 where current point (curPt)is added to the point list. This records the X and Y position for the new segment as this segment completes the line. From step 314 FindPath 78 proceeds as shown in FIG. 12H and as described hereinafter.

FIG. 12H provides additional information on FindPath 78. Step 316 of FindPath 78 follows in response to step 312 in FindPath 78 in FIG. 12C determining that a path from the starting point to the ending point has been completed. At step 316 the cost of the new segment completing the path is added to the score for that path. Also, FindPath 78 as shown in FIG. 12H may be entered at step 330 from FindPath 78 in FIG. 12D whenever deadlock for a path is detected at step 280 or the maximum recursion for a path has been exceeded at step 282. Either of these events at steps 280 or 282 results whenever an "undesirable" path has been attempted, e.g., the path begins proceeding upon itself in an attempt to reach the destination point or the path will have too many segments to be acceptable. Therefore, at step 330, fifty points is added to the score for that path to virtually ensure that any line incorporating that segment will not have the best score.

Step 318 in FIG. 12H may be entered from step 316, step 330, or whenever the answer at step 338 in FIG. 12G indicates that the iterations through the segments in PathCostList 86 are complete, which is described in discussions of FIG. 12G hereinafter. Next, at step 318 the number of tries previously calculated in steps 200, 202, and 204 is added to the score. This takes into account rectactive being cut in half in order to find an open corridor in CorridorPlaneSweep 90 so that a segment that is completed only after rectActive is halved does not obtain an artificially low score.

At step 320 a query is made as to whether the score for the current path to this point is lower than the best score so far. This simple test determines whether the line just completed should be saved. If the answer is no then the flow proceeds to step 322 where the recursion count (RecursionCount)is decremented as the line just calculated by FindPath 78 cannot beat the best score so far so this recursion to calculate a segment does not count against the possible number of recursions through FindPath 78.

If, however, the answer at step 320 is yes that the score of a line including the current segment is lower than the best score so far, then the flow proceeds to step 324 where the points for the "new best path" (ptsBest) are set to this point list as these points represent the line or path now having the best score from the starting point to the destination point. Also, at step 326 the best score (bestscore) of all paths between the starting point and destination point that have been so far calculated is set to the score of the current path found at step 320 to have a score lower than the previous bestscore. From Step 326 the recursion count is decremented at step 322 as previously described and at step 328 FindPath 78 returns to IntelliRoute 76 so that additional paths from the starting point to the destination point may be calculated in hopes of beating the new bestscore.

FIG. 12G provides additional information on FindPath 78 when the answer at step 312 in FIG. 12C is that a path from the starting point to the destination point has not been completed. The portion of FindPath 78 in FIG. 12G is necessary whenever FindPath 78 has located a number of possible segments for the line to proceed in from its current position and when the current position is not at the destination point, i.e., at least one additional segment is necessary to complete the line to the destination point. FindPath 78 in FIG. 12G goes through each of the possible segments from the current position and calls IntelliRoute 76 so that a new rectactive may be identified and open corridors in the new direction may be located from the end of each of the segments in the current PathCostList. As previously noted, once IntelliRoute 76 is called, it will in turn call FindPath 78, which will call IntelliRoute 76, and this recursion will continue until the predetermined recursion count, which in one embodiment of the present invention is fifteen, is reached. Therefore, for each possible path identified when FindPath 78 as shown in FIG. 12G is entered, IntelliRoute 76 is accessed so that the line from the starting point to the destination point may be completed.

Before FindPath 78 calls IntelliRoute 76 a number of calculations must be made. At step 334 the current number of points in the resulting path up to this point is saved (numPts). Next at step 336 an iteration through the segments in the PathCostList 86 is initiated. For each segment in PathCostList 86, IntelliRoute 76 will be called. At step 338 a query is made as to whether the iterations though all the segments in PathCostList 86 are complete. If they are, then FindPath 78 proceeds as shown in FIG. 12H as previously described. If, the answer at step 338 is no, then at step 340 current X point is set to the X point (Pt.X) of the iterative current segment (iter.CurPath). Therefore, on the first pass through step 340, the current point X is set to the destination X point of the first segment in PathCostList 86, e.g., point 46' for segment 46 in FIG. 10A. On the second pass through step 340, the current point X is set to the destination X point of the second segment in PathCostList 86, e.g., point 56' for segment 56 in FIG. 10B, and this continues for all the segments in PathCostList 86.

At step 342 the current direction is set to the new direction for each segment in PathCostList 86 for each pass through step 342 similarly to step 340. At step 344 the iterative current path cost (iter.CurPathCost) is added to the current score. Before proceeding in FindPath 78 in FIG. 12G and eventually to IntelliRoute 76, the cost of the segment in PathCostList 86 must be added to the current score for the path. This allows the present system and method for routing a line to continually test whether the score of the current path can beat the score of other paths already found between the starting point and destination point.

At step 346 the number of points for the path up to its current point is reset to the number of points for the path as saved at step 334. The path to this point has an associated score and the points for the next segment as defined by the list of segments in PathCostList 86 is reset to this number of points. At step 348 the current point (curPt) is added to the result points (resultPts). This increments the cost for the path due to proceeding onto the next segment. Once step 348 is completed all the necessary information for a given segment in PathCostList 86 is ready and FindPath 78 can call IntelliRoute 76 at step 350. Eventually the flow of FindPath 78 will return to step 338 where each segment in PathCostList 86 is processed to find the line with the best score between a starting point and a destination point. At step 350 FindPath 78 calls IntelliRoute 76.

By this way the present system and method searches a limited number of paths between a starting position and an ending position. IntelliRoute 76 continually checks whether the current path being calculated should be abandoned and sets up the information needed by FindPath 78. FindPath 78, in turn, determines the cost of a given length of each segment in heading in a particular direction. The recursive use of these two routines allows for routing a line between the symbols in a chart quickly and easily. Additionally, the flowcharts described in detail above can readily be converted by one skilled in the art into computer implemented instructions executable by a processor.

The present invention provides a technical advantage of a system and method for automatically routing a line through a computer-generated graphics chart while avoiding the symbols in the chart to the extent possible. Another technical advantage of the present invention is that it routes a line through the symbols in a chart very quickly so that a user can see where a line will be placed in the chart.

Although the present invention has been described in detail, it should be understood that various changes, substitutions, and alterations can be made hereto without departing from the spirit and scope of the invention as defined by the appended claims.

What is claimed is:

1. A method for automatically routing a line through a graphics chart from a starting point to an ending point in the chart to connect graphically two symbols, the method comprising the steps of:

collecting data for the chart representing the location of each symbol in the chart and the starting and ending points for the line;

determining a number of paths for the line from the starting point to the ending point;

scoring each of the paths from the determining step;

selecting the path with the best score as the path to route the line from the starting point to the ending point; and displaying the line along the path with the best score.

2. The method of claim 1 wherein the scoring step further comprises counting the number of points in the path and the number of symbols pierced by the path.

3. The method of claim 1 wherein the selecting step further comprises selecting the path with the lowest score.

4. The method of claim 1 wherein the determining step further comprises determining paths for the line from the starting point to the ending point that do not pierce any symbols in the chart.

5. The method of claim 1 wherein the determining and scoring steps further comprise:

determining each path as a series of orthogonal segments from the starting point to the ending point;

scoring each segment as it is completed and adding the segment's score to the path's current score;

comparing the path's current score to a best score for all other completed paths from the starting point to the ending point; and abandoning the path if the current path's score exceeds the best score.

6. The method of claim 1 wherein the determining, scoring, and selecting steps further comprise:

identifying open corridors in the chart from the starting point to the ending point, wherein each corridor represents a beginning location and an ending location for a segment in the line;

calculating a next direction for the path from the segment's ending location based on the segment's ending location and the line's ending point and the direction at the segment's ending location and the direction at the line's ending point;

scoring each segment; and selecting the path whose segments have the best score from the line's starting point to the ending point.

7. A method for automatically routing a line through a graphics chart from a starting point to an ending point in the chart, the method comprising the steps of:

collecting data for the chart representing the location of each symbol in the chart and the starting and ending points for the line:

identifying an inner region defined by the starting and the ending points of the line;

extending the inner region;

truncating the extended inner region for any symbols presenting a barrier to routing the line in the extended region;

searching for open corridors in the truncated extended inner region;

calculating a beginning location and an ending location of a segment for each open corridors;

calculating a next direction for the path from the segment's ending location based on the segment's ending location and the line's ending point and the direction at the segment's ending location and the direction at the line's ending point;

scoring each segment;

selecting the path whose segments have the best score from the line's starting point to the ending point; and displaying the line along the path with the best score.

8. A computer program for automatically routing a line through a graphics chart from a starting point to an ending point in the chart to connect graphically two symbols, the program comprising:

computer implemented instructions for collecting data for the chart representing the location of each symbol in the chart and the starting and ending points for the line;

computer implemented instructions for determining a number of paths for the line as a series of orthogonal segments from the starting point to the ending point;

computer implemented instructions for scoring each of the paths;

computer implemented instructions for selecting the path with the best score as the path to route the line from the starting point to the ending point; and computer implemented instructions for displaying the line along the path with the best score.

9. The program of claim 8 wherein the computer implemented instructions for scoring each of the paths further comprises instructions for counting the number of points in the path and the number of symbols pierced by the path.

10. The program of claim 8 wherein the computer implemented instructions for selecting the path with the best score further comprises instructions for selecting the path with the lowest score.

11. The program of claim 8 wherein the computer implemented instructions for determining a number of paths further comprises instructions for determining paths for the line from the starting point to the ending point that do not pierce any symbols in the chart.

12. The program of claim 8 wherein the computer implemented instructions for determining and scoring further comprise:

instructions for determining each path as a series of segments from the starting point to the ending point;

instructions for scoring each segment as it is completed and adding the segment's score to the current path's score;

instructions for comparing the path's current score to a best score for all other completed paths from the starting point to the ending point; and instructions for abandoning the path if the path's current score exceeds the best score.

13. The program of claim 8 wherein the computer implemented instructions for determining, scoring, and selecting further comprise:

instructions for identifying open corridors in the chart from the starting point to the ending point, wherein each corridor represents a beginning location and an ending location for a segment in the line;

instructions for calculating a next direction for the path from the segment's ending location based on the segment's ending location and the line's ending point and the direction at the segment's ending location and the direction at the line's ending point;

instructions for scoring each segment; and instructions for selecting the path whose segments have the best score from the line's starting point to the ending point.

14. A computer program for automatically routing a line through a graphics chart from a starting point to an ending point in the chart. the program comprising:

instructions for collecting data for the chart representing the location of each symbol in the chart and the starting and ending points for the line; instructions for identifying an inner region defined by the starting and the ending points of the line;

instructions for extending the inner region;

instructions for truncating the extended inner region for any symbols presenting a barrier to routing the line in the extended region;

instructions for searching for open corridors in the truncated extended inner region;

instructions for calculating a beginning location and an ending location of a segment for each open corridors;

instructions for calculating a next direction for the path from the segment's ending location based on the segment's ending location and the line's ending point and the direction at the segment's ending location and the direction at the line's ending point;

instructions for scoring each segment;

instructions for selecting the path whose segments have the best score from the line's starting point to the ending point; and instructions for displaying the line along the path whose segments have the best score.

15. A computer graphics system for automatically routing a line through a graphics chart from a starting point to an ending point to connect graphically two symbols, the system comprising:

a computer-readable medium;

a processor;

a visual display; and a computer program encoded on the computer-readable medium for execution on the processor, the computer program comprising:

instructions for collecting data for a chart representing the location of each symbol in the chart;

instructions for determining a number of paths for the line as a series of orthoaonal segments from the starting point to the ending point;

instructions for calculating a score for each of the paths;

instructions for selecting the path with the best score as the path to route the line from the starting point to the ending point; and instructions for displaying on the visual display the line along the path with the best score.

16. The computer graphics system of claim 15, wherein the instructions for calculating further comprise instructions for counting the number of points in the path.

17. The computer graphics system of claim 15, wherein the instructions for calculating further comprise instructions for counting the number of symbols pierced by the path.

18. The computer graphics system of claim 15, wherein the instructions for determining a number of paths further comprise instructions for determining paths for the line from the starting point to the ending point that do not pierce any symbols in the chart.

19. The computer graphics system of claim 15, wherein the instructions for determining and scoring further comprise:

instructions for determining each path as a series of segments from the starting point to the ending point;

instructions for scoring each segment as it is completed and adding the segment's score to the current path's score;

instructions for comparing the path's current score to a best score for all other completed paths from the starting point to the ending point; and instructions for abandoning the path if the path's current score exceeds the best score.

20. The computer graphics system of claim 15, wherein the instructions for determining, scoring, and selecting further comprise:

instructions for identifying open corridors in the chart from the starting point to the ending point, wherein each corridor represents a beginning location and an ending location for a segment in the line;

instructions for calculating a next direction for the path from the segment's ending location based on the segment's ending location and the line's ending point and the direction at the segment's ending location and the direction at the line's ending point;

instructions for scoring each segment; and instructions for selecting the line whose segments have the best score from the line's starting point to the ending point.

21. A computer graphics system for automatically routing a line through a graphics chart from a starting point to an ending point, the system comprising:

a computer-readable medium;

a processor;

a visual display; and a computer program encoded on the computer-readable medium for execution on the processor, the computer program comprising:

instructions for collecting data for a chart representing the location of each symbol in the chart;

instructions for identifying an inner region defined by the starting and the ending points of the line;

instructions for extending the inner region;

instructions for truncating the extended inner region for any symbols presenting a barrier to routing the line in the extended region;

instructions for searching for open corridors in the truncated extended inner region;

instructions for calculating a beginning location and an ending location of a segment for each open corridors;

instructions for calculating a next direction for the path from the segment's ending location based on the segment's ending location and the line's ending point and the direction at the segment's ending location and the direction at the line's ending point;

instructions for scoring each segment:

instructions for selecting the line whose segments have the best score from the line's starting point to the ending point: and instructions for displaying on the visual display the line along the path with the best score.

22. A computer readable medium encoded with instructions to execute, on a computer, the following steps:

collecting data for a chart representing the location of each symbol in the chart;

obtaining a starting point and an ending point of a line to be routed in the chart to connect graphically two symbols;

determining a number of paths for the line as a series of orthogonal line segments from the starting point to the ending point;

calculating a score for each of the paths, wherein calculating the score includes counting the number of orthogonal line segments;

selecting the path with the best score as the path to route the line from the starting point to the ending point; and displaying the line along the path with the best score.

23. The computer readable medium of claim 22, wherein the calculating step further comprises counting the number of points in the path.

24. The computer readable medium of claim 22, wherein the calculating step further comprises counting the number of symbols pierced.

25. The computer readable medium of claim 22, wherein the determining step further comprises determining paths for the line from the starting point to the ending point that do not pierce any symbols in the chart.

26. The computer readable medium of claim 22, wherein the determining and calculating steps further comprise:

determining each path as a series of segments from the starting point to the ending point;

scoring each segment as it is completed and adding the segment's score to the path's current score;

comparing the path's current score to a best score for all other completed paths from the starting point to the ending point; and abandoning the path if the current path's score exceeds the best score.

27. The computer readable medium of claim 22, wherein the determining, calculating, and selecting steps further comprise:

identifying open corridors in the chart from the starting point to the ending point, wherein each corridor represents a beginning location and an ending location for a segment in the line;

calculating a next direction for the path from the segment's ending location based on the segment's ending location and the line's ending point and the direction at the segment's ending location and the direction at the line's ending point;

scoring each segment; and selecting the path whose segments have the best score from the line's starting point to the ending point.

28. A computer readable medium encoded with instructions to execute, on a computer, the following steps:

collecting data for a chart representing the location of each symbol in the chart;

obtaining a starting point and an ending point of a line to be routed in the chart;

identifying an inner region defined by the starting and the ending points of the line;

extending the inner region;

truncating the extended inner region for any symbols presenting a barrier to routing the line in the extended region;

searching for open corridors in the truncated extended inner region;

calculating a beginning location and an ending location of a segment for each open corridors;

calculating a next direction for the path from the segment's ending location based on the segment's ending location and the line's ending point and the direction at the segment's ending location and the direction at the line's ending point;

scoring each segment; and selecting the path whose segments have the best score from the line's starting point to the ending point;

displaying the line along the path with the best score.

* * * * *